(12) United States Patent
Jun et al.

(10) Patent No.: US 12,541,499 B2
(45) Date of Patent: Feb. 3, 2026

(54) SECURITY DATA PROCESSING METHOD AND DEVICE

(71) Applicant: Samsung Electronics Co., Ltd., Suwon-si (KR)

(72) Inventors: Hyeeun Jun, Suwon-si (KR); Kisung Lee, Suwon-si (KR); Kiwon Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 18/455,224

(22) Filed: Aug. 24, 2023

(65) Prior Publication Data
US 2023/0409733 A1 Dec. 21, 2023

Related U.S. Application Data

(63) Continuation of application No. PCT/KR2021/019959, filed on Dec. 27, 2021.

(30) Foreign Application Priority Data

Mar. 5, 2021 (KR) .......................... 10-2021-0029539

(51) Int. Cl.
*G06F 21/62* (2013.01)
*G06F 16/23* (2019.01)

(52) U.S. Cl.
CPC ........ *G06F 16/2365* (2019.01); *G06F 16/235* (2019.01); *G06F 21/6227* (2013.01)

(58) Field of Classification Search
CPC .. G06F 16/162; G06F 16/235; G06F 16/2365; G06F 16/25; G06F 16/252;
(Continued)

(56) References Cited

U.S. PATENT DOCUMENTS

| 9,330,301 | B1 | 5/2016 | Ozog |
| 11,409,719 | B2 | 8/2022 | Eberlein |

(Continued)

FOREIGN PATENT DOCUMENTS

| CN | 106155832 B | 3/2019 |
| JP | 2020-095723 A | 6/2020 |

(Continued)

OTHER PUBLICATIONS

Qian Li et al., Database Management Strategy and Recovery Methods of Android, 2013 IEEE 4th International Conference on Software Engineering and Service Science, IEEE, Jun. 27, 2014, pp. 727-730, XP032667574.

(Continued)

*Primary Examiner* — Theodore C Parsons
(74) *Attorney, Agent, or Firm* — Jefferson IP Law, LLP

(57) ABSTRACT

A method and a device are provided. The device includes a display, a memory and a processor operatively connected to the display or the memory, wherein the processor is configured to receive a request for updating security data in which security attributes are set in application data, identify the state of an additional file corresponding to the security data, determine a first security data processing process if the state of the identified additional file is invalid or determine a second security data processing process if the state of the identified additional file is valid, and update the security data according to the determined security data processing process.

20 Claims, 13 Drawing Sheets

(58) Field of Classification Search
CPC ........ G06F 21/44; G06F 21/565; G06F 21/60; G06F 21/6227
See application file for complete search history.

(56) References Cited

U.S. PATENT DOCUMENTS

| | | |
|---|---|---|
| 2008/0177802 A1 | 7/2008 | Haye et al. |
| 2014/0359309 A1 | 12/2014 | Cachin et al. |
| 2016/0321144 A1 | 11/2016 | Zankl et al. |
| 2017/0046524 A1 | 2/2017 | Lee et al. |
| 2017/0083254 A1 | 3/2017 | Benoit et al. |
| 2017/0083604 A1 | 3/2017 | Syed-Ebrahim et al. |
| 2019/0155792 A1* | 5/2019 | Jeong ............... G06F 12/06 |
| 2019/0207917 A1 | 7/2019 | Tasher |
| 2020/0192826 A1 | 6/2020 | Ben-Simon et al. |
| 2021/0026831 A1 | 1/2021 | Mishra et al. |
| 2021/0042293 A1* | 2/2021 | Jun .................. G06F 16/27 |

FOREIGN PATENT DOCUMENTS

| | | |
|---|---|---|
| KR | 10-0898968 B1 | 5/2009 |
| KR | 10-2009-0111850 A | 10/2009 |
| KR | 10-1442489 B1 | 9/2014 |
| KR | 10-1539617 B1 | 8/2015 |
| KR | 10-2017-0019799 A | 2/2017 |
| KR | 10-2132534 B1 | 7/2019 |
| WO | 2015/138931 A1 | 9/2015 |

OTHER PUBLICATIONS

Extended European Search Report dated Jun. 14, 2024, issued in European Patent Application No. 21929322.2.

International Search Report dated Apr. 4, 2022, issued in International Application No. PCT/KR2021/019959.

* cited by examiner

FIG. 7A
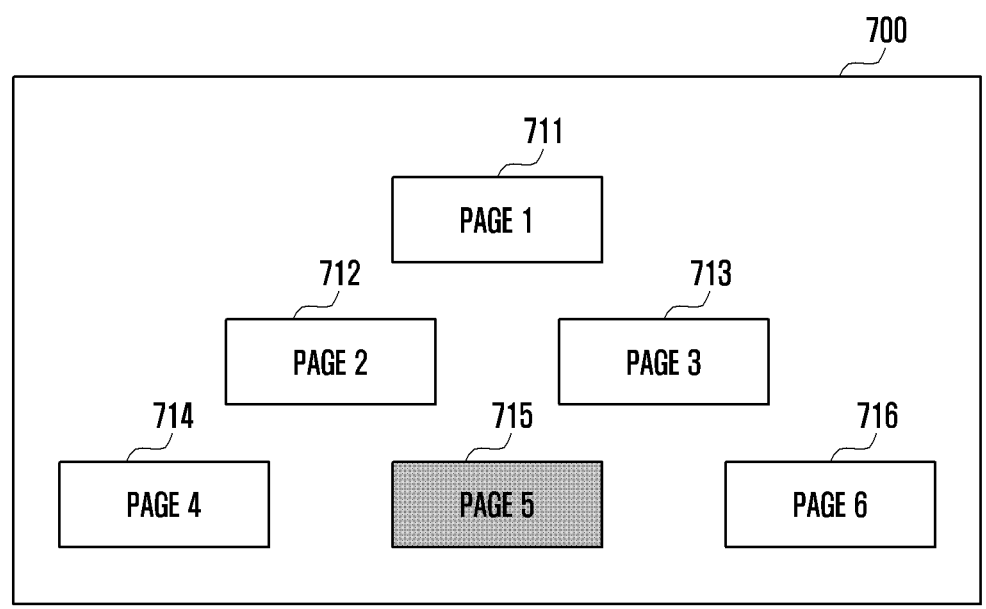
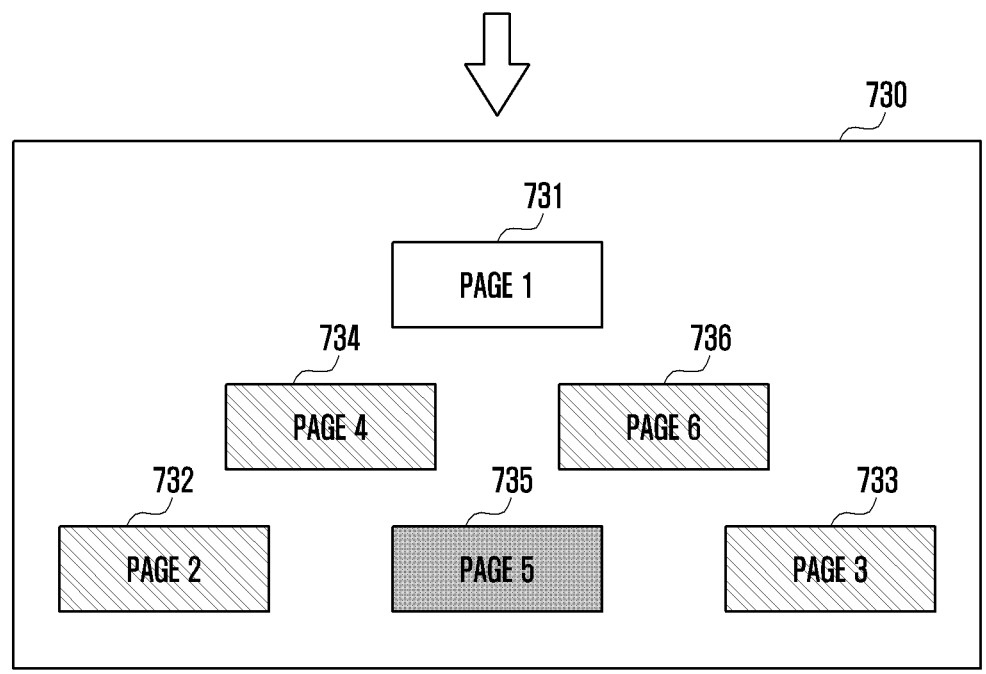

FIG. 7B
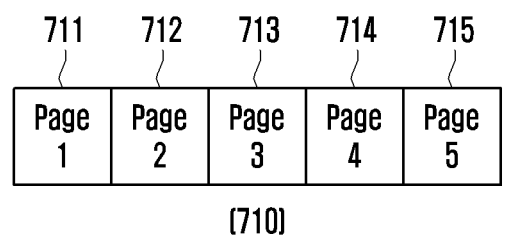
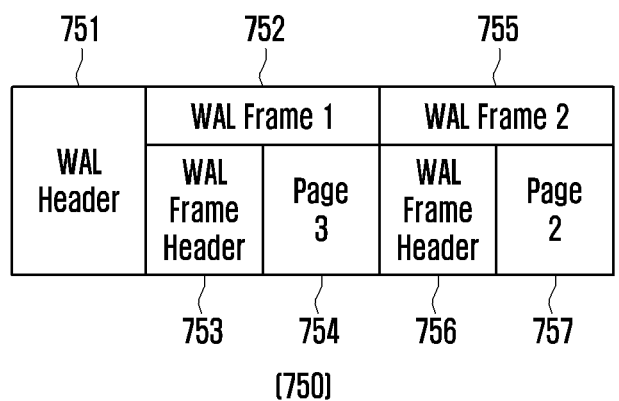
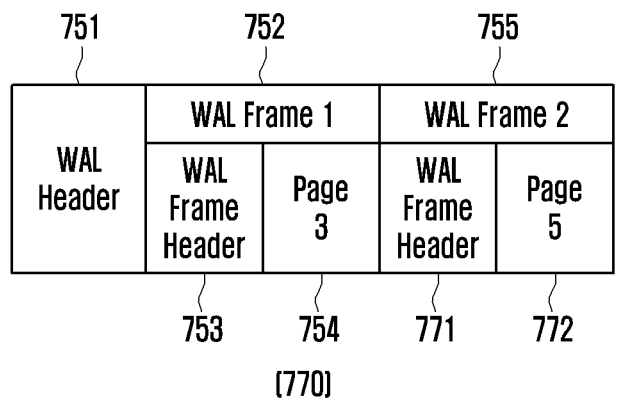

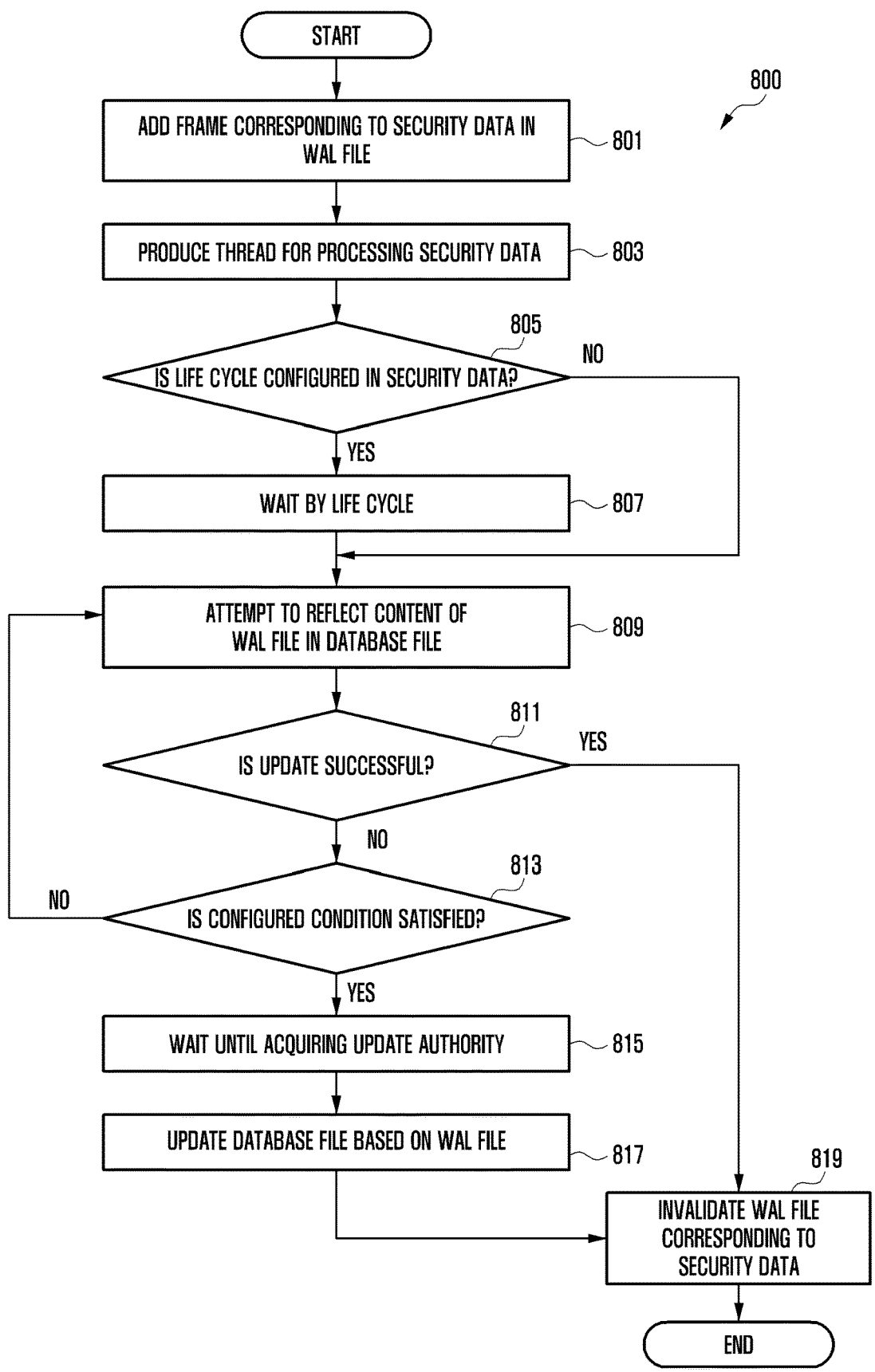

SECURITY DATA PROCESSING METHOD AND DEVICE

CROSS-REFERENCE TO RELATED APPLICATION(S)

This application is a continuation application, claiming priority under § 365(c), of an International application No. PCT/KR2021/019959, filed on Dec. 27, 2021, which is based on and claims the benefit of a Korean patent application number 10-2021-0029539, filed on Mar. 5, 2021, in the Korean Intellectual Property Office, the disclosure of which is incorporated by reference herein in its entirety.

BACKGROUND

1. Field

The disclose relates to a security data processing method and device.

2. Description of Related Art

With the development of digital technology, various types of electronic devices such as mobile communication terminals, personal digital assistants (PDAs), electronic notebooks, smartphones, tablet personal computers (PCs), or wearable devices are widely used. In order to support and increase functions of these electronic devices, hardware components and/or software components of the electronic devices are continuously being improved.

On the other hand, for normal operation of an application, the electronic devices need to ensure atomicity of transactions for application data stored in a database and data integrity to always maintain normal data in a database. The transaction may include an update operation such as modification, deletion, or addition of an application (or application data). The atomicity may mean that all or none of the results of all operations related to one transaction are reflected in the database. The database can use a journal technique to ensure data integrity and atomicity of transactions. The journal technique may be a technique of producing and utilizing a write ahead log (WAL) file or a rollback journal file in addition to a database file storing application data.

The above information is presented as background information only to assist with an understanding of the disclosure. No determination has been made, and no assertion is made, as to whether any of the above might be applicable as prior art with regard to the disclosure.

SUMMARY

In a WAL journal mode, when a database file is updated, a processing result related to the update may be stored in a WAL file before updating the database file. For example, when a specific page of the database file is updated, an update processing result related to the specific page may be recorded in the form of being appended to the WAL file. Since the update processing result is recorded in the form of being appended to the WAL file, data requested to be deleted may still remain in the database file or the WAL file.

Aspects of the disclosure are to address at least the above-mentioned problems and/or disadvantages and to provide at least the advantages described below. Accordingly, an aspect of the disclosure is to provide a method and device for handling the updated security data not to remain in the database file or a WAL file when security data is updated (e.g., modified or deleted) among data stored in a database file.

Additional aspects will be set forth in part in the description which follows and, in part, will be apparent from the description, or may be learned by practice of the presented embodiments.

In accordance with an aspect of the disclosure, an electronic device is provided. The electronic device includes a display, a memory, and a processor configured to be operatively connected to the display or the memory, wherein the processor is configured to receive a request for updating security data in which security attributes are configured in application data, identify a state of an additional file corresponding to the security data, determine a first security data processing process when the identified state of the additional file is invalid or determine a second security data processing process when the identified state of the additional file is valid, and update the security data according to the determined security data processing process.

In accordance with another aspect of the disclosure, an operating method of an electronic device is provided. The operating method includes receiving a request for updating security data in which security attributes are configured in application data, identifying a state of an additional file corresponding to the security data, determining a first security data processing process when the identified state of the additional file is invalid, determining a second security data processing process when the identified state of the additional file is valid, and updating the security data according to the determined security data processing process.

According to various embodiments, the security issue may be solved by handling updated security data not to remain in a database file or a WAL file.

According to various embodiments, by differently applying a processing process based on a state of a WAL file corresponding to updated security data, it is possible to safely delete pages in a database file or a WAL file corresponding to the security data.

According to various embodiments, by completely deleting pages in a database file or a WAL file corresponding to security data from an electronic device, it is possible to prevent the deleted security data from being restored by a forensic technique later.

According to various embodiments, by configuring security attributes for the entire database or a designated area (e.g., table or column), configuring security attributes in a specific range using a structured query language (SQL) statement, executing a secure write transaction using an application programming interface (API) statement, or configuring security attributes for the memory or storage of an electronic device, it is possible to delete data configured with security attributes when updating the data.

According to various embodiments, it is possible to reduce performance deterioration caused by deletion of a database file or a WAL file corresponding to security data or inefficient logic related to memory usage of an electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7A and 7B are diagrams illustrating examples of a database file and a WAL file according to various embodiments of the disclosure;

FIG. 8 is a flowchart illustrating a method of performing a third security data processing process in an electronic device according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
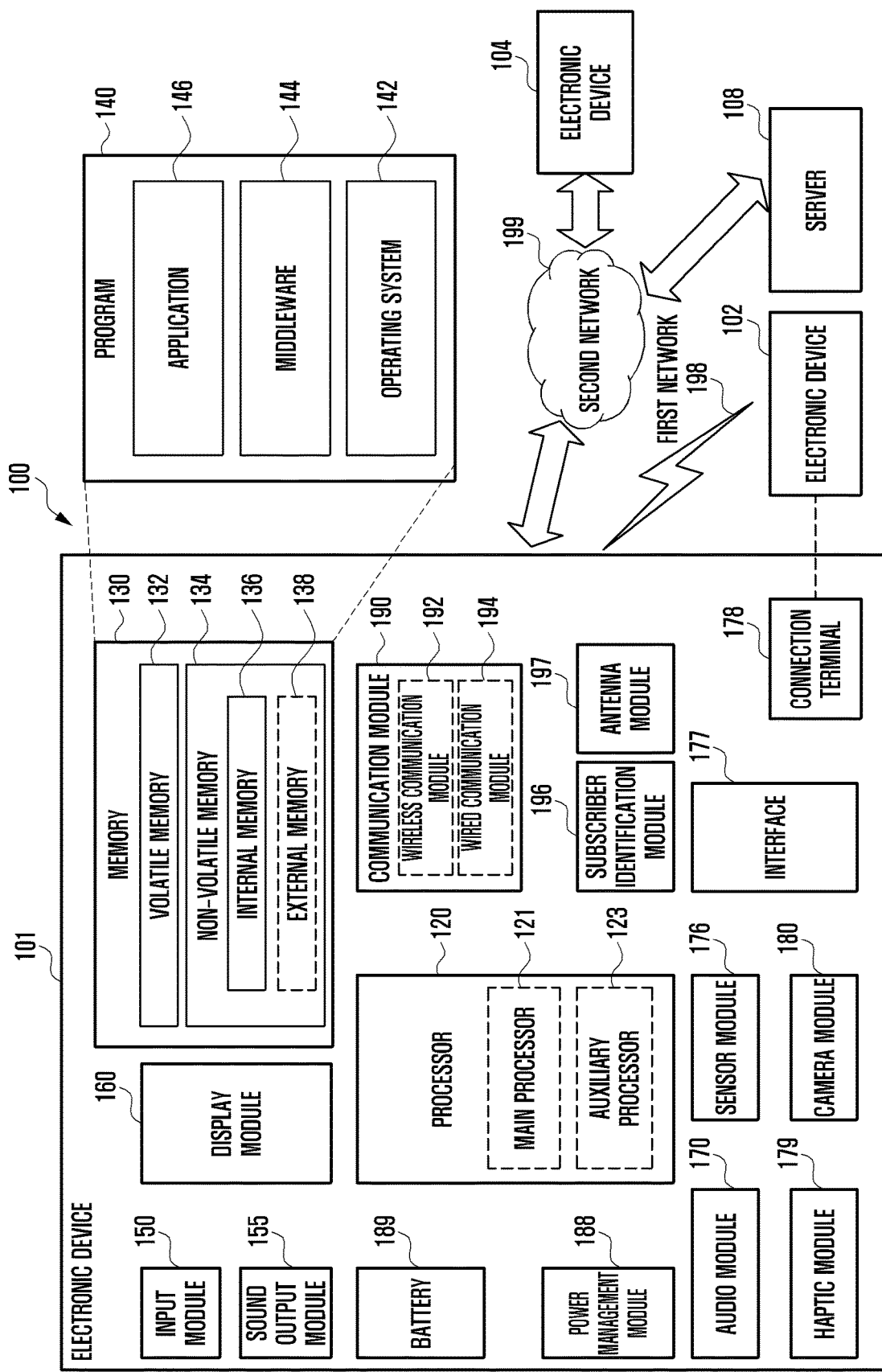
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
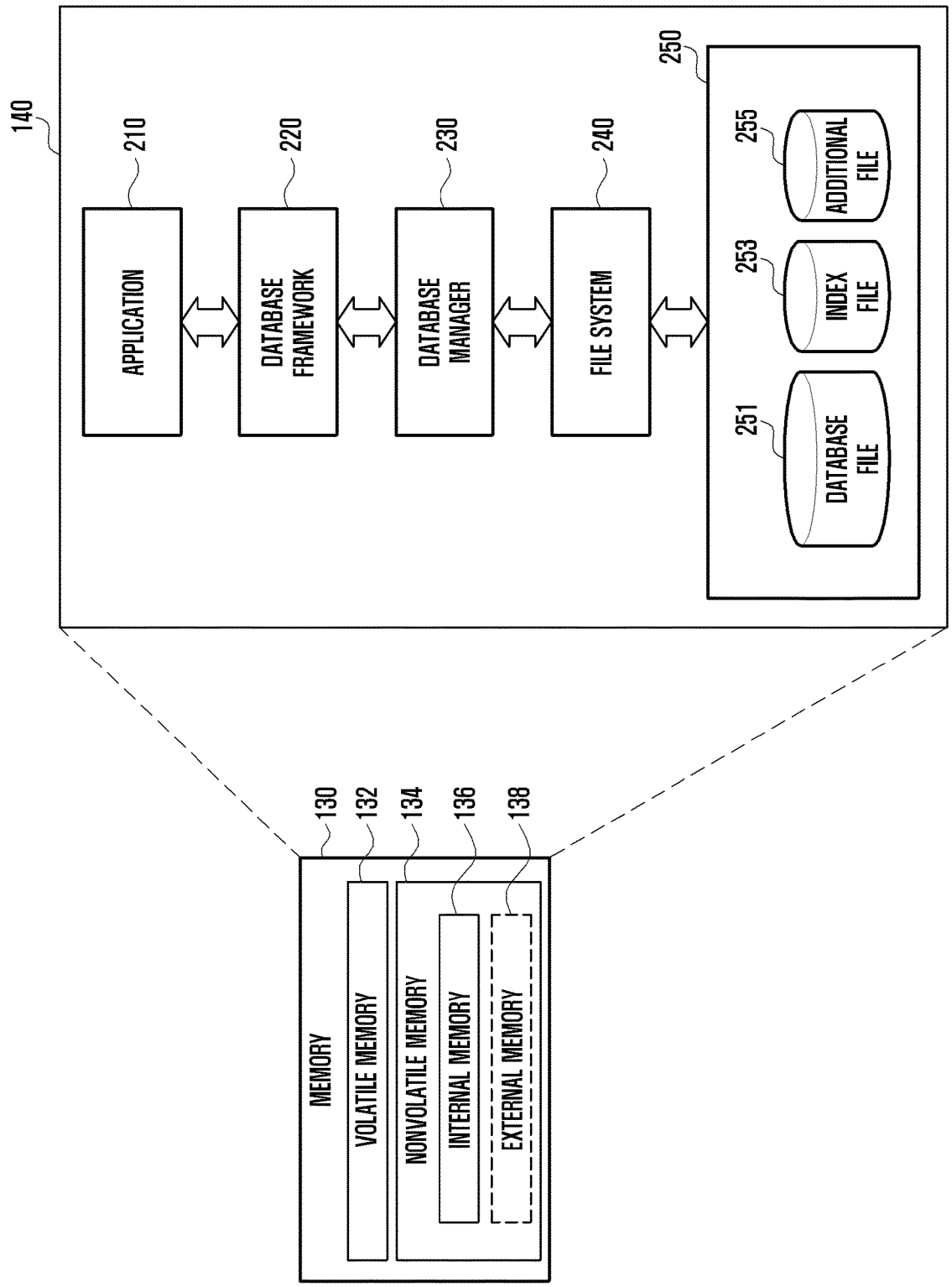
FIG. 2 illustrates a program block diagram of an electronic device according to an embodiment of the disclosure.

FIG. 2 illustrates a program block diagram of an electronic device according to an embodiment of the disclosure.

Referring to FIG. 2, an electronic device (e.g., the electronic device 101 of FIG. 1) according to various embodiments may include an operating system (OS) that controls resources related to the electronic device 101, middleware, and a program 140 including various applications (e.g., the application 210) executed on the OS. The OS may be, for example, Android, iOS, Windows, Symbian, Tizen, or Bada. At least a part of the program 140 may be preloaded on the electronic device 101 or downloaded from an external electronic device (e.g., the electronic device 102 or 104 or the server 108).

The program 140 may include an application 210, a database framework 220, a database manager 230, a file system 240, or a database 250. The applications 210 may include various types of applications (e.g., phone calls, text messages, alarms, and contacts) installed on the electronic device 101. The database framework 220 may provide functions commonly required by the applications 210, or may provide various functions to the application 210 so that the application 210 can efficiently use limited system resources inside the electronic device 101. The database manager 230 may provide various functions to the application 210 so that the application 210 may use functions or information provided from one or more resources of the electronic device 101. The file system 240 may refer to a system that manages files stored in an auxiliary storage device or a database 250 (e.g., the memory 130 of FIG. 1) in an OS. The database 250 may include a database file 251, an index file 253, or an additional file 255.

According to various embodiments, the database 250 may include a relational database (RDB), not only SQL1 (NoSQL) database, a hierarchical database, and/or a network database. For example, the database 250 may include Oracle, MySQL (Oracle), MS-SQL (Microsoft), DB2, Infomix (IBM), Maria DB (Sun Microsystems), Derby (Apache), and/or SQLite (opensource).

According to various embodiments, the electronic device 101 may manage data stored in a storage based on the file system 240, for example, the nonvolatile memory 134. For example, the electronic device 101 may use the file system 240 to manage a location where data (e.g., a file) of the database file 251 is stored. The file system 240 may be included in the OS 142. The electronic device 101 may configure at least a portion of the volatile memory 132 and/or the nonvolatile memory 134 of the memory 130 as storage. The storage may correspond to a storage area in which data related to the electronic device 101 is preserved. Hereinafter, the memory may mean a portion of the volatile memory 132 and/or the nonvolatile memory 134 that is distinct from the storage area. For example, the memory may correspond to a work area for processing data related to the electronic device 101.

The electronic device 101 according to various embodiments may manage data related to the application 146 based on the database file 251. The database file 251 is a set of organized data, and may refer to a set of data stored in the storage based on a designated list or data structure. Applications and services installed in the electronic device 101 may be performed based on the database file 251. In this case, while the electronic device 101 is operating, access to the database file 251 by a plurality of different applications and services may occur frequently. A plurality of database files 251 stored in the storage of the electronic device 101 may be provided.

According to various embodiments, a journal technique may be applied to the database 250 to ensure data integrity and atomicity of transactions. The journal technique may be a technique of producing and utilizing the additional file 255 in addition to the database file 251 storing application data. The database file 251 may store application data, and may include a database header, a database schema, database content, or a data structure. The additional file 255 may include a write ahead log (WAL) file or a rollback journal (rollback journal) file. For example, in the WAL file, when application data is updated, processing results related to the update may be stored before updating the database file 251. When the update condition of the WAL file is satisfied, content stored in the WAL file may be reflected in the database file. For example, in a rollback journal file, when application data is updated, original application data may be stored before updating the database file. The rollback journal file may be a backup of the application data. The WAL file and the rollback journal file may differ only in the data they store, and may be similar in a method in which they update the database file.

According to various embodiments, when the application data is updated (e.g., modified, deleted, or added), the database manager 230 may add content related to the update to the WAL file in the form of a frame. Transactions are logical units of work (LUW) of operations related to data of the database file 251 and may be units of interaction between the application 146 and the database file 251. An operation related to the data of the database file 251 may mean, for example, an operation of accessing the database file 251 based on a structured query language (SQL) such as OPEN, SELECT, INSERT, DELETE, UPDATE, or CLOSE. In an embodiment, one transaction may refer to a set of one or more operations and/or queries related to data in the database file 251. In an embodiment, a transactional operation may include a read transaction (or operation), an addition transaction, a modification (or change) transaction, or a deletion transaction.

The index file 253 may be a file (e.g., a WAL index file) that stores mapping information of parts of the database file 251 and the results stored in the additional file 255. In an embodiment, the mapping information may indicate in which part of the database file 251 the results stored in the additional file 255 should be included. For example, the mapping information may be information obtained by matching the changed data stored in the additional file 255 and the position of a part of the database file 251 related to the data. The data stored in the database file 251 may be managed based on, for example, a page unit having a designated size (e.g., a size between 512 Byte and 64 megabyte (Mbyte)). The additional file 255 may store data of the database file 251 changed based on the transaction, based on a frame unit having a size (e.g., a size obtained by combining the size of the page and the size of the frame header) based on the page. The mapping information stored in the index file 253 may indicate which frame of the additional file 255 corresponds to which page of the database file 251.

In an embodiment, the electronic device 101 may retrieve a hash table included in the mapping information of the index file 253 based on an identifier (e.g., page number) of the page of the database file 251, thereby identifying a part (e.g., frame) of the additional file 255 corresponding to the page having the identifier. For example, the electronic device 101 may identify the frame number of the additional file 255 corresponding to a designated page number. The index file 253 may include an area related to an update authority (e.g., file locking) for preventing and/or controlling concurrent access of one or more transactions to the database file 251. The update authority may be used to prevent errors that may occur when a plurality of transactions simultaneously access the database file 251.

An electronic device (e.g., the electronic device of FIG. 1) according to various embodiments may include a display (e.g., the display module 160 of FIG. 1), a memory (e.g., the memory 130 of FIG. 1), and a processor (e.g., the processor 120 of FIG. 1) configured to be operatively connected to the display or the memory, wherein the processor may be configured to: receive a request for updating security data in which security attributes are configured in application data; identify a state of an additional file corresponding to the security data; determine a first security data processing process when the identified state of the additional file is invalid or determine a second security data processing process when the identified state of the additional file is valid; and update the security data according to the determined security data processing process.

The first security data processing process may be configured to: acquire an update authority for a database file stored in the memory; update the database file corresponding to the security data without the additional file; and return the update authority when the update is completed.

The second security data processing process may be configured to: determine whether a page structure of the database file stored in the memory is changed; determine whether a page corresponding to the security data exists in the additional file when the page structure is not changed; acquire the update authority of the database file when the page corresponding to the security data does not exist in the additional file; update the database file to correspond to the security data without the additional file; and return the update authority when the update is completed.

The processor may be configured to perform a third security data processing process when the first security data processing process or the second security data processing process fails.

The third security data processing process may be configured to: add a frame corresponding to the security data to the additional file; produce a thread for processing the security data; update the database file to correspond to the security data based on a life cycle configured in the security data; and invalidate the additional file corresponding to the security data when the update is completed.

The processor may be configured to: when the life cycle is configured in the security data, wait for the update by the life cycle, determine whether an update condition of the additional file is satisfied after the life cycle has elapsed, and acquire an update authority for the database file to attempt to update the database file to correspond to the security data when the update condition is satisfied; and when the life cycle is not configured in the security data, determine whether the update condition of the additional file is satisfied, and acquire the update authority for the database file to attempt to update the database file to correspond to the security data when the update condition is not satisfied.

The processor may be configured to: determine whether a configured condition is satisfied when the attempted update fails; wait for the update until acquiring the update authority when the configured condition is satisfied; and acquire the update authority to update the database file to correspond to the security data.

The processor may be configured to invalidate the additional file by truncating the size of the additional file corresponding to the security data or by overwriting a frame of the additional file.

The processor may be configured to perform one of an operation of truncating the size of the additional file based on a storage space of the memory or an operation of overwriting the frame of the additional file.

The processor may be configured to: perform the overwriting operation when the storage space of the memory is equal to or greater than a predetermined size; and perform the truncating operation when the storage space of the memory is less than the predetermined size.

The processor may be configured to determine whether security attributes are configured in a storage for the database file when the database file stored in the memory is opened; and apply the security attributes to the entire opened database file when the security attributes are configured in the storage.

The processor may be configured to determine whether the security attributes are configured in the memory when the security attributes are not configured in the storage; and read a value configured in the memory to perform update corresponding to the security data when the security attributes are configured in the memory, and the security attributes of the storage may have a characteristic of being maintained until an application corresponding to the database file is deleted, and the security attributes of the memory may have a characteristic of being maintained to correspond to a connection of the database file.

The security attributes may be configured in at least one of the entire database file and a table or column of the database file.

Figure 3:
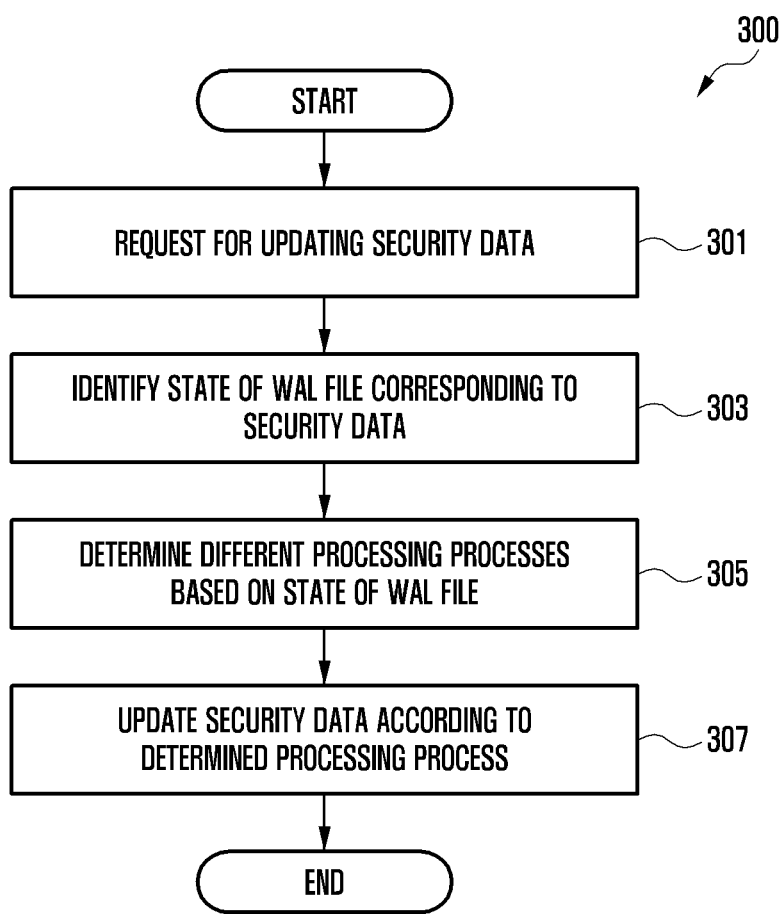
FIG. 3 is a flowchart illustrating an operating method of an electronic device according to an embodiment of the disclosure.

FIG. 3 is a flowchart 300 illustrating an operating method of an electronic device according to an embodiment of the disclosure.

Referring to FIG. 3, in operation 301, a processor (e.g., the processor 120 of FIG. 1) of an electronic device (e.g., the electronic device 101 of FIG. 1) according to various embodiments may receive a request for updating security data. The security data may mean data in which security attributes are configured among application data, and may refer to data that requires, when deleted, secure deletion so that the deleted security data does not exist in a storage. The security attributes may be configured to perform a secure deletion function only for a designated transaction when the entire database file 251 or a desired area (e.g., a designated table or column of the database file 251 of FIG. 2) is configured by an application developer or when the security data is updated. In order to provide the secure deletion function, a function capable of detecting whether there is a change in the security data may be required. The security attributes may be configured in a memory (e.g., the volatile memory 132 of FIG. 1) or a storage (e.g., the nonvolatile memory 134 of FIG. 1). The processor 120 may identify the request for updating the security data by analyzing in which table or which column of the database file 251 the security data is changed, or by analyzing a query for changing or deleting the security data.

A method of configuring security for application data will be described in detail with reference to FIGS. 9A and 9B below. The update refers to a transaction, and the transaction may include an operation of reading, adding, deleting, or modifying application data. The update request may occur by a user or according to the configuration of the electronic device 101. In an operation (or transaction) of reading or adding security data, previous security data may not remain in the database file 251 or a WAL file (e.g., the additional file 255 of FIG. 2). In an operation of modifying (or changing) or deleting security data, previous security data may remain in the database file 251 or the WAL file.

According to the disclosure, previous security data may be processed so that the pervious security data does not remain in the database file or the WAL file, and operation 301 may include an operation (or transaction) of modifying or deleting security data. For a request for updating application data other than security data, the processor 120 may execute an existing WAL mode (e.g., an operation of adding a frame corresponding to a page which is requested to be updated to the WAL file and reflecting the content of the WAL file in the database file 251 when an update condition of the WAL file is satisfied).

In operation 303, the processor 120 may identify the state of the WAL file corresponding to the security data. A journal technique may be applied to the memory (e.g., the memory 130 of FIG. 1) of the electronic device 101 to ensure data integrity and atomicity of transactions. The journal technique may be a technique of producing and utilizing a write ahead log (WAL) file or a rollback journal file as an additional file in addition to a database file storing application data. The database file (e.g., the database file 251 of FIG. 2) may store application data and may be composed of a database header, a database schema, database content, or a data structure. Referring to FIG. 3, a case in which the additional file (e.g., the additional file 255 of FIG. 2) is a WAL file is described as an example, but the disclosure is not limited by the description. For example, the WAL file may include a WAL header and at least one WAL frame. The WAL header may include basic information about the WAL file, and may include, for example, at least one of an identification number, a file format version, a page size, an update count, a frame error check, and a WAL header error check.

According to various embodiments, the identification number may include a magic number for recognizing the WAL file. The file format version may have a fixed value as a format version for a WAL file. The database file 251 may be divided and managed with a certain size, and chunks divided into the certain size can be interpreted as pages. The page size may correspond to the page stored in the database file 251. The update count may mean the number of times frames stored in the WAL file are reflected in the database file. Reflecting the frame stored in the WAL file to the database file 251 may be referred to as update or checkpoint. Each time the frame stored in the WAL file is reflected in the database file 251, the update count may increase (e.g., +1). The frame error check may mean an arbitrary value (e.g., a salt value) produced when the WAL file is initialized. When a value included in the frame error check is the same as a value included in a header error check included in the WAL frame, the WAL frame may be recognized as a normal frame. The WAL header error check may include a value (e.g., checksum) for determining whether there is an error in the WAL header. The information included in the WAL header is an example to help understanding of the disclosure, but does not limit the disclosure.

The WAL frame may include changes (e.g., modification, deletion, addition) in the application data stored in the database file 251. The WAL frame may be composed of a WAL frame header and a page. The frame of the WAL file may be mapped to the page stored in the database file 251, and a page number mapped to the WAL frame header may be recorded. For example, the WAL frame may include at least one of a WAL frame header, a page number, a bCommit, a header error check, a WAL frame error check, or a database page. The page number may mean a page number with changes. The bCommit may indicate the size of the database file 251 in the case of a commit frame, or may be configured to 0 in the case of other frames. The header error check may store the same value as a value included in the frame error check included in the WAL header. The WAL frame error check may include a value (e.g., checksum) for determining whether there is an error in the WAL frame. The database page may include a page in which changes are reflected. The content included in the WAL frame is an example to help understanding of the disclosure, but does not limit the disclosure.

When an update request for the database file 251 stored in the memory 130 occurs, the processor 120 may add a frame of a WAL file (e.g., a WAL frame) to correspond to the updated page of the database file 251. For example, when an update corresponding to one page of the database file 251 is requested, the processor 120 may add a frame including the number of the updated page to the WAL file. Alternatively, when an update corresponding to two pages of the database file 251 is requested (e.g., a first page and a third page), the processor 120 may add frames (e.g., a first frame corresponding to the first page and a second frame corresponding to the third page) including numbers of two different updated pages to the WAL file.

The state of the WAL file may include a state in which the WAL file is valid or invalid. The state in which the WAL file is valid may mean a state in which the WAL header of the WAL file is valid and at least one WAL frame is included in the WAL file. The state in which the WAL file is invalid may include at least one of a state in which there is no WAL file, a state in which the size of the WAL file is 0, a state in which the WAL header of the WAL file is invalid (e.g., zero filled), or a state in which there is no valid WAL frame.

In operation 305, the processor 120 may determine a different processing process based on the state of the WAL file. For example, the processor 120 may determine to perform a first security data processing process when the WAL file is in an invalid state, and may determine to perform a second security data processing process when the WAL file is in a valid state. The first security data processing process may be to acquire update authority of the database file 251, update the database file 251 without the WAL file, and return the update authority when the update is completed. The first security data processing process will be described in detail with reference to FIG. 4 below.

When the page structure of the database file 251 is not changed and a page to be updated does not exist in the WAL file, the second security data processing process may acquire the update authority of the database file 251, may update the database file 251 without the WAL file, and may return the update authority when the update is completed. The second security data processing process will be described in detail with reference to FIG. 6 below. The processor 120 may determine to perform the first security processing process or the second security processing process according to the state of the WAL file.

In operation 307, the processor 120 may update the security data according to the determined processing process. The processor 120 may update security data according to the first security processing process or the second security processing process. When the processor 120 cannot perform the first security data processing process and the second security data processing process, the processor 120 may perform a third security data processing process. The third security data processing process may add a frame corresponding to the updated security data to the WAL file, may produce a thread for processing the security data, may attempt to update the database file 251 after waiting by a security data life cycle, and may invalidate a WAL file corresponding to the updated security data when the update is successful. The third security data processing process may wait until acquiring an update authority when the update fails, may update the database file 251 based on the WAL file, and may then invalidate the WAL file corresponding to the updated security data.

Figure 4:
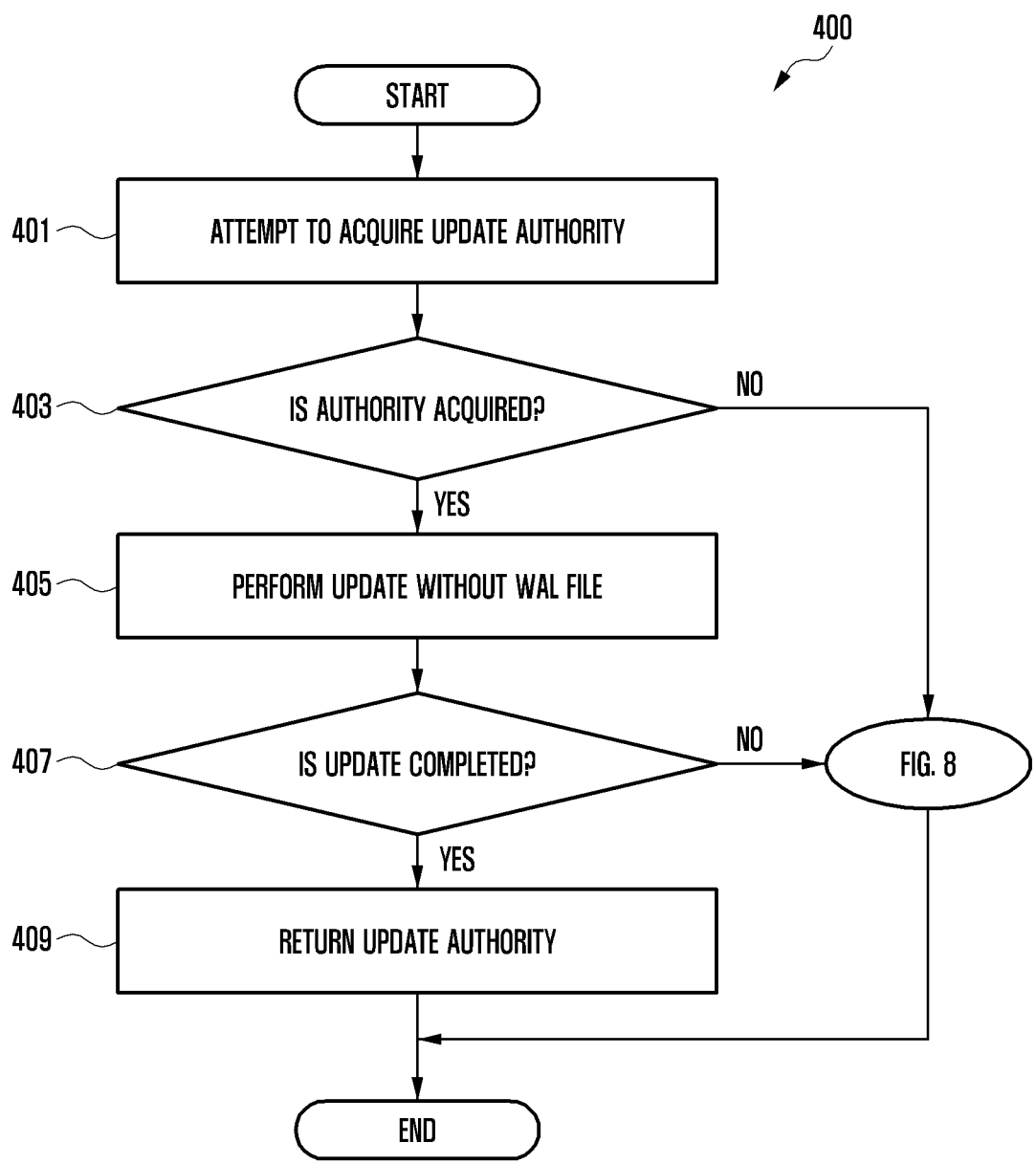
FIG. 4 is a flowchart illustrating a method of performing a first security data processing process in an electronic device according to an embodiment of the disclosure.

FIG. 4 is a flowchart 400 illustrating a method of performing a first security data processing process in an electronic device according to an embodiment of the disclosure. FIG. 4 illustrates an operation of performing operation 307 of FIG. 3 in detail.

Referring to FIG. 4, in operation 401, a processor (e.g., the processor 120 of FIG. 1) of an electronic device (e.g., the electronic device 101 of FIG. 1) according to various embodiments may attempt to acquire an update authority. When the state of a WAL file is invalid, the processor 120 may directly apply an update corresponding to security data to a database file (e.g., the database file 251 of FIG. 2) without the WAL file. In order to access the database file 251, the update authority may be required. The update authority may refer to a file lock configured to prevent one or more transactions from simultaneously accessing a database file (e.g., the database file 251 of FIG. 2).

For example, the transaction may include a read transaction (or operation), an addition transaction, a modification (or change) transaction, or a deletion transaction. When the deletion transaction is performed while the read transaction is performed, an error may occur in the database file 251. In order to prevent an error in the database file 251, an authority for controlling only one transaction to access the database file 251 may be interpreted as the update authority. The update authority may be included in a WAL index file (e.g., the index file 253 of FIG. 2). The update authority may mean having full authority corresponding to all transactions (e.g., read, add, modify, and delete).

In operation 403, the processor 120 may determine whether the update authority is acquired. When updating the security data, the processor 120 may update the security data after acquiring the update authority. The processor 120 may perform operation 405 when the update authority is acquired, and may perform operations of FIG. 8 when the update authority is not acquired. The operations of FIG. 8 may be performed when the first security data processing process cannot be performed, and may be the third security data processing process.

When the update authority is acquired, in operation 405, the processor 120 may perform the update without the WAL file. A journal technique (e.g., a WAL mode) may be applied to a database (e.g., the database 250 of FIG. 2). In the journal technique, when an application data update occurs, processing results related to a corresponding update may be stored in the WAL file before the database file 251 is updated, and when an update condition of the WAL file is satisfied, the content stored in the WAL file may be reflected in the database file 251. Even after the content stored in the WAL file is reflected in the database file 251, the content stored in the WAL file may remain without being deleted. The first security data processing (or deletion) process may include, when application data (e.g., security data) having security attributes is changed or deleted, a secure deletion function capable of preventing security data from remaining in the WAL file or the database file 251.

According to various embodiments, when a write transaction (e.g., modification or deletion transaction) corresponding to security data occurs in the WAL mode, the processor 120 may be switched to an atomic write mode in runtime and may then use the atomic write mode. The atomic write mode may be a technique that can be used for a write transaction in the electronic device 101 providing a flash-friendly file system (F2FS). The atomic write mode may be a mode in which in-place update is possible without a separate WAL file. In the WAL mode, processing results related to the corresponding update may be stored in the WAL file, but in the atomic write mode, the application data updated without the WAL file may be directly reflected in the database file 251. When the content stored in the WAL file corresponds to an update condition in the WAL mode, the content may be stored in the database file 251, and for the security data, the processor 120 may directly reflect the corresponding update in the database file 251 without the WAL file.

In operation 407, the processor 120 may determine whether the update is completed. The processor 120 may perform operation 407 when the update is completed, and may perform operations of FIG. 8 when the update is not completed. The processor 120 may directly reflect the update in the database file 251 without the WAL file so that the update may fail. When the update fails, the processor 120 may perform a third security data processing process by performing operations of FIG. 8.

When the update is completed, in operation 409, the processor 120 may return the update authority. The processor 120 may have the update authority while updating, and return the update authority when the update is completed. The update authority is the full authority to access the database file 251, and may be returned when the update is completed.

Figure 5:
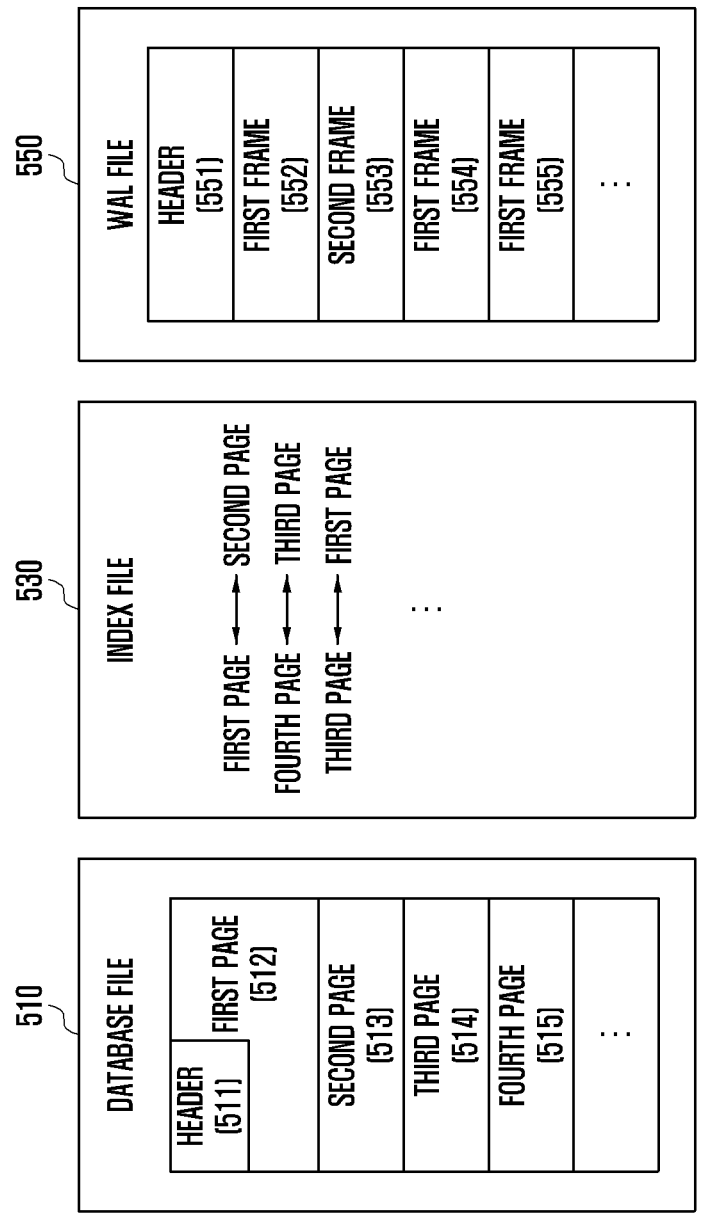
FIG. 5 is a diagram illustrating a database structure of an electronic device according to an embodiment of the disclosure.

FIG. 5 is a diagram illustrating a database structure of an electronic device according to an embodiment of the disclosure.

Referring to FIG. 5, a database of an electronic device (e.g., the electronic device 101 of FIG. 1) according to various embodiments may include a database file 510 (e.g., the database file 251 of FIG. 2), an index file 530 (e.g., the index file 253 of FIG. 2), and a WAL file 550 (e.g., the additional file 255 of FIG. 2). The database file 510, the index file 530, and the WAL file 550 may be based on a file system (e.g., the file system 240 of FIG. 2) and may be stored in a storage corresponding to at least a part of a nonvolatile memory (e.g., the nonvolatile memory 134 of FIG. 1). The database file 510 may include at least one page. The size of each of a plurality of files related to the database file 510 may be, for example, 4 KB or more, which is the size of the page. The size of each of the plurality of files may be changed to a value different from the page size by the file system 240 and/or a database manager (e.g., the database manager 230 of FIG. 2).

The database file 510 may include a first page 512, a second page 513, a third page 514, and a fourth page 515. The first page 512 may include a header 511 of the database file 510 and a database schema. The header 511 may include a plurality of parameters representing attributes of the database file 510. The data structure of the second page 513 to the fourth page 515 may have a data structure for faster data search in the database file 510.

The WAL file 550 may store data changed based on a transaction in the WAL mode. The data included in the WAL file 550 may be distinguished in units of frames. The size of the frame may correspond to a combination of the size of a page and the size of a frame header which are used to distinguish data and/or information included in the database file 510. The WAL file 550 may include a header 551 and a plurality of frames (e.g., a first frame 552, a second frame 553, a third frame 554, and a fourth frame 555). The electronic device 101 may determine an update condition for the WAL file 550 based on the size of the WAL file 550 and/or the number of the frames included in the WAL file 550, and may reflect the frame stored in the WAL file 550 to the page of the database file 510 when the update condition is satisfied.

The index file 530 may be used to identify in which part or which position of the database file 510 the changed data of the database file 510 stored in the WAL file 550 is located. The index file 530 may include an update authority (e.g., file lock) to prevent concurrent access to the database file 510. The index file 530 may include mapping information that matches the frames stored in the WAL file 550 to their corresponding pages in the database file 510. The electronic device 101 may identify that the first page 512 of the database file 510 matches the second frame 553 of the WAL file 550 based on the mapping information. Based on the index file 530, the electronic device 101 may identify that the fourth page 515 corresponds to the third frame 554 and the third page 514 corresponds to the first frame 552.

The mapping information may be used when the electronic device 101 changes data of the database file 510 based on the WAL file 550. For example, the electronic device 101 may change the first page 512 of the database file 510 based on the second frame 553 of the WAL file 550, may change the fourth page 515 of the database file 510 based on the third frame 554, and may change the third page 514 of the database file 510 based on the first frame 552.

Figure 6:
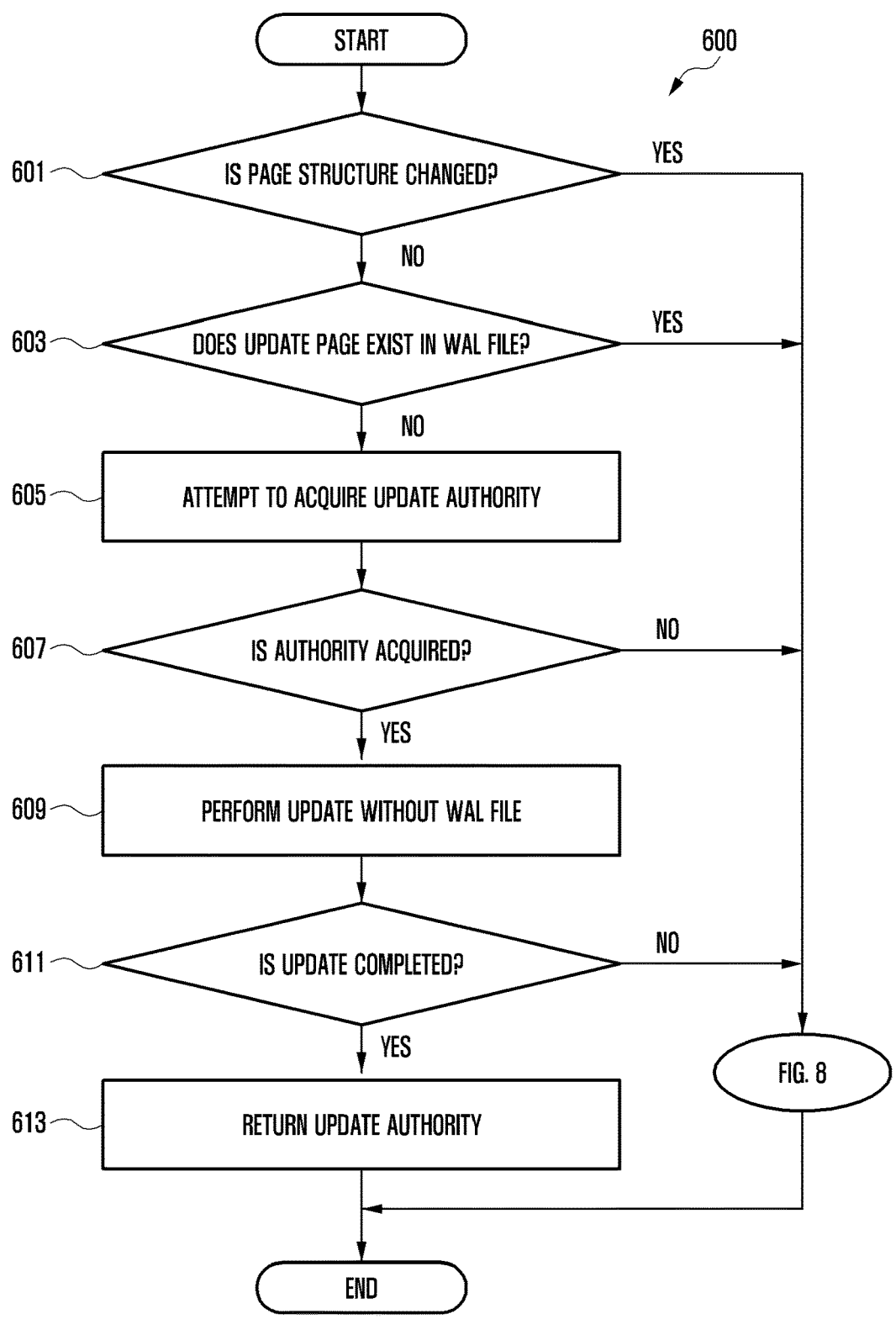
FIG. 6 is a flowchart illustrating a method of performing a second security data processing process in an electronic device according to an embodiment of the disclosure.

FIG. 6 is a flowchart 600 illustrating a method of performing a second security data processing process in an electronic device according to an embodiment of the disclosure. FIG. 6 illustrates an operation of performing operation 307 of FIG. 3 in detail.

Referring to FIG. 6, in operation 601, a processor (e.g., the processor 120 of FIG. 1) of an electronic device (e.g., the electronic device 101 of FIG. 1) according to various embodiments may determine whether a page structure of a database file (e.g., the database file 251 of FIG. 2) is changed. When the state of the WAL file is valid, the processor 120 may directly apply an update corresponding to security data to a database file (e.g., the database file 251 of FIG. 2) without a WAL file only when a designated condition is satisfied. The designated condition may include a case where the page structure of the database file 251 is not changed and a page corresponding to security data does not exist in the WAL file. When the state of the WAL file is valid, the processor 120 may determine whether the designated condition is satisfied based on an index file (e.g., the index file 530 of FIG. 5).

According to various embodiments, the database file 251 may be configured in units of pages, and each page may be a node of a B-tree. The B-tree is a type of tree data structure widely used in databases and file systems, and may be a tree structure in which the maximum number of child nodes that one node can have by extending a binary tree is greater than 2. When the page of the database file 251 corresponding to the node of the B-tree is modified, the configuration of the B-tree may be changed. For example, when a large number of pages are deleted, a change in the tree structure may occur in order to balance the B-tree structure. An operation of changing the tree structure may mean a rebalancing operation. When the tree structure is changed, the position of the page corresponding to the node of the B-tree may be changed. Since a frame corresponding to the page of the database file 251 exists in a WAL file (e.g., the WAL file 550 of FIG. 5), the frame may include a page structure of the database file 251. In a case where the page structure of the database file 251 is changed, when the processor 120 applies an update to the database file 251 without the WAL file, an error may occur.

The processor 120 may perform operations of FIG. 8 when the page structure of the database file 251 is changed, and may perform operation 603 when the page structure of the database file 251 is not changed.

When the page structure of the database file 251 is not changed, in operation 603, the processor 120 may determine whether an update page exists in the WAL file. The update page (or the latest update page) may refer to a page corresponding to security data requested to be updated in operation 301 of FIG. 3. The WAL file may include one or more frames corresponding to one page. For example, after a first frame corresponding to a first page is produced in one transaction, a second frame corresponding to a third page and a third frame corresponding to the first page may be produced in another transaction. When the frame of the WAL file is updated to the database file 251, the most recently stored frame may be reflected.

For example, when the first frame and the third frame exist for the same first page, the processor 120 may reflect the third frame in the first page of the database file 251. For example, when the frame corresponding to the update page has already existed in the WAL file, the most recent update may be directly reflected in the database file 251 without the WAL file, but when the update condition of the WAL file is satisfied afterwards, a problem in that the frame already having existed in the WAL file is reflected in the database file 251 may occur. The processor 120 may determine whether the update page exists in the WAL file based on mapping information stored in the index file 530.

The processor 120 may perform operations of FIG. 8 when the update page exists in the WAL file, and may perform operation 605 when the update page does not exist in the WAL file.

Although it is shown that operation 601 is performed first and operation 603 is performed later in the drawing, operation 603 may be performed first and operation 601 may be performed later, or operations 601 and 603 may be performed simultaneously. This is only an example to help understanding of the disclosure, and does not limit the disclosure.

When the update page does not exist in the WAL file, in operation 605, the processor 120 may attempt to acquire update authority. The update authority may refer to a file lock configured to prevent one or more transactions from simultaneously accessing a database file (e.g., the database file 251 of FIG. 2). The update authority may be included in a WAL index file (e.g., the index file 253 of FIG. 2). The update authority may mean having full authority corresponding to all transactions (e.g., read, addition, modification, and deletion). Since operation 605 is the same as or similar to operation 401 of FIG. 4, a detailed description thereof may be omitted.

In operation 607, the processor 120 may determine whether the update authority is acquired. When updating the security data, the processor 120 may update the security data after acquiring the update authority. The processor 120 may perform operation 609 when the update authority is acquired, and may perform operations of FIG. 8 when the update authority is not acquired. The operations of FIG. 8 may be performed when the second security data processing process cannot be performed, and may be the third security data processing process. Since operation 607 is the same as or similar to operation 403 of FIG. 4, a detailed description thereof may be omitted.

When the update authority is acquired, in operation 609, the processor 120 may perform an update without the WAL file. Even after the content stored in the WAL file is reflected in the database file 251, the content stored in the WAL file may remain without being deleted. When application data (e.g., security data) having security attributes is changed or deleted, the second security data processing (or deletion) process may include a secure deletion function capable of preventing security data from remaining in the WAL file or database file 251. In the WAL mode, when the content stored in the WAL file meets the update condition, the content may be reflected in the database file 251, and for the security data, the processor 120 may directly reflect the update in the database file 251 without the WAL file. Since operation 609 is the same as or similar to operation 405 of FIG. 4, a detailed description thereof may be omitted.

In operation 611, the processor 120 may determine whether the update is completed. The processor 120 may perform operation 613 when the update is completed, and may perform operations of FIG. 8 when the update is not completed. The processor 120 may directly reflect the update in the database file 251 without the WAL file, resulting in a failure in the update. When the update fails, the processor 120 may perform the third security data processing process by performing the operations of FIG. 8. Since operation 611 is the same as or similar to operation 407 of FIG. 4, a detailed description thereof may be omitted.

When the update is completed, in operation 613, the processor 120 may return the update authority. The processor 120 may have the update authority while performing the update, and may return the update authority when the update is completed. The update authority is the full authority to access the database file 251, and may be returned when the update is completed. Since operation 613 is the same as or similar to operation 409 of FIG. 4, a detailed description thereof may be omitted.

FIGS. 7A and 7B are diagrams illustrating examples of a database file and a WAL file according to various embodiments of the disclosure.

FIG. 7A is a diagram illustrating a page structure of a database file according to an embodiment of the disclosure.

Referring to FIG. 7A, a database file 700 (e.g., the database file 251 of FIG. 2) of an electronic device (e.g., the electronic device 101 of FIG. 1) according to various embodiments may include one or more pages, and each page may be a node of a B-tree. For example, the database file 700 may include a first page 711, may include a second page 712 and a third page 713 as child nodes of the first page 711, may include a fourth page 714 and a fifth page 715 as child nodes of the second page 712, and may include a sixth page 716 as a child node of the third page 713. The security data requested to be updated may correspond to the fifth page 715. When the page structure of the database file 700 is not changed while the WAL file (e.g., the WAL file 550 of FIG. 5) is valid and a frame corresponding to the fifth page 715 does not exist in the WAL file, the electronic device 101 may perform the second security data processing process (e.g., flowchart 600 of FIG. 6).

According to various embodiments, the tree structure of the database file 700 may be changed. For example, the database file 730 of which tree structure is changed may include a first page 731, may include a fourth page 734 and a sixth page 736 as child nodes of the first page 731, may include a second page 732 as a child node of the fourth page 734, and may include a fifth page 735 and a third page 733 as child nodes of the sixth page 736. The security data requested to be updated may correspond to the fifth page 735. When the page structure of the database file 730 is changed while the WAL file (e.g., the WAL file 550 of FIG. 5) is valid, the electronic device 101 may not perform the second security data processing process.

FIG. 7B is a diagram illustrating an internal structure of a WAL file according to an embodiment of the disclosure.

Referring to FIG. 7B, the database file 710 may include the first page 711, the second page 712, the third page 713, the fourth page 714, and the fifth page 715. The database file 710 of FIG. 7B may have the page structure of the database file 700 of FIG. 7A. The security data requested to be updated may correspond to the fifth page 715. For example, when updates of the third page 713 and the second page 712 of the database file 710 are sequentially requested, a WAL header 751, a first frame 752 corresponding to the third page 713, and a second frame 755 corresponding to the second page 712 may be added in a state in which a WAL file 750 is valid. The first frame 752 may include a WAL frame header 753 and a change 754 corresponding to the third page 713. The second frame 755 may include a WAL frame header 756 and a change 757 corresponding to the second page 712. Since the page structure of the database file 710 is not changed while the WAL file 750 is valid and a frame corresponding to the fifth page 715 requested to be updated does not exist in the WAL file 750, the electronic device 101 may perform the second security data processing process.

According to various embodiments, when updates of the third page 713 and the fifth page 715 of the database file 710 are sequentially requested, the WAL header 751, the first frame 752 corresponding to the third page 713, and the second frame 755 corresponding to the fifth page 715 may be added to the WAL file 770 while the WAL file 770 is valid. The first frame 752 may include a WAL frame header 753 and a change 754 corresponding to the third page 713. The second frame 755 may include a WAL frame header 771 and a change 772 corresponding to the fifth page 715. When a frame (e.g., the second frame 755) corresponding to the fifth page 715 requested to be updated exists in the WAL file 750 although the page structure of the database file 710 is not changed while the WAL file 750 is valid, the electronic device 101 may not perform the second security data processing process.

FIG. 8 is a flowchart 800 illustrating a method of performing a third security data processing process in an electronic device according to an embodiment of the disclosure. FIG. 8 illustrates an operation of performing operation 307 of FIG. 3 in detail.

Referring to FIG. 8, in operation 801, a processor (e.g., the processor 120 of FIG. 1) of an electronic device (e.g., the electronic device 101 of FIG. 1) according to various embodiments may add a frame corresponding to security data in a WAL file. When both the first security data processing process (e.g., flowchart 400 of FIG. 4) and the second security data processing process (e.g., flowchart 600 of FIG. 6) are not performed, in order to delete a WAL file (e.g., the WAL file 770 in FIG. 7B) corresponding to security data, it may be necessary to perform an operation (e.g., a checkpoint operation) of reflecting a frame stored in the WAL file to a database file (e.g., the database file 710 of FIG. 7B) according to an update condition of the WAL file. When the first and second security data processing processes fail, the processor 120 may add the frame corresponding to the security data to the WAL file according to a conventional journal technique. For example, the security data requested to be updated may correspond to the fifth page (e.g., the fifth page 715 of FIG. 7B) of the database file 710. The processor 120 may add a frame corresponding to the fifth page 715 to the WAL file.

In operation 803, the processor 120 may produce a thread for processing the security data. When an update is requested (e.g., a transaction occurs), the processor 120 may produce a thread corresponding to the requested update. The processor 120 may produce a separate thread other than the thread corresponding to the requested update. The produced thread may be a thread operating in the background.

In operation 805, the processor 120 may determine whether a life cycle is configured for the security data. Logic for deleting the security data may cause additional overhead compared to a WAL mode operation. In order to reduce the overhead, the processor 120 may configure the life cycle such that the security data is deleted within a certain period of time without immediately deleting the security data. The life cycle may be configured in a storage or a memory. A value configured in the memory may be deleted when a connection of the database file 251 is terminated, such as in a volatile memory (e.g., the volatile memory 132 of FIG. 1).

The life cycle may be configured by an application developer. Alternatively, an application layer (e.g., an application) may configure the life cycle in various ways according to the provision of a framework. The life cycle may be configured in the database file 251, a designated table of the database 250, and a designated column of the database 250 using an application programming interface (API) or SQL statement. The life cycle may be configured through secure write transaction execution using an API statement or secure write transaction execution using an SQL statement.

The processor 120 may perform operation 807 when the life cycle is configured in the security data, and may perform operation 809 when the life cycle is not configured in the security data.

When the life cycle is configured in the security data, in operation 807, the processor 120 may wait by the life cycle. When the security data is repeatedly updated within a short period of time, an additional process may be required due to repeatedly performing the checkpoint operation. The processor 120 may wait by the life cycle so as not to repeatedly perform the checkpoint operation.

In operation 809, the processor 120 may attempt to reflect (e.g., a checkpoint operation) the content of the WAL file in the database file 710. When the life cycle is configured, the processor 120 may determine whether an update condition of the WAL file is satisfied after the life cycle has passed, and may acquire an update authority for the database file to attempt to perform the checkpoint operation when the update condition is satisfied. When the life cycle is not configured, the processor 120 may determine whether the update condition of the WAL file is satisfied, and may acquire an update authority for the database file to attempt to perform the checkpoint operation when the update condition is satisfied.

The update condition of the WAL file may be that the size of the WAL file corresponds to a predetermined size or the number of frames included in the WAL file corresponds to a predetermined number. Since the size of each frame is limited, when the number of frames corresponds to the predetermined number, it can be interpreted that the size of the WAL file corresponds to the predetermined size. In order to perform the checkpoint operation without failure, it may be necessary to wait until all currently operating transactions (e.g., read, addition, modification, and deletion) are terminated and the update authority is acquired. The checkpoint operation attempted in operation 809 may fail due to the occurrence of the read transaction.

In operation 811, the processor 120 may determine whether the update is successful. When the processor 120 attempts to perform the checkpoint operation after all transactions are terminated, the update may succeed. The processor 120 may perform operation 819 when the update succeeds and perform operation 813 when the update fails.

In operation 813, the processor 120 may determine whether the configured condition is satisfied. The configured condition may include the time or count (e.g., 3 times, 5 times, or 10 times) configured based on the life cycle. For example, the processor 120 may attempt to perform the checkpoint operation for twice the life cycle, and when twice the life cycle has elapsed, it may be determined that the configured condition is satisfied. When the number of times the checkpoint operation is attempted to be performed is counted and the counted number exceeds the predetermined number, the processor 120 may determine that the configured condition is satisfied. The processor 120 may perform operation 815 when the configured condition is satisfied, and may return to operation 809 when the configured condition is not satisfied. When the configured condition is not satisfied, the processor 120 may return to operation 809, and may repeatedly attempt to perform the checkpoint operation for a predetermined number of times.

When the configured condition is satisfied, in operation 815, the processor 120 may wait until acquiring the update authority. In order to perform the checkpoint operation without failure, it may be necessary to wait until all currently operating transactions are terminated and the update authority is acquired.

In operation 817, the processor 120 may acquire the update authority to update the database file 710 based on the WAL file 770. Operation 817 may be to acquire the update authority and perform the checkpoint operation, and operation 809 may be to attempt to perform the checkpoint operation regardless of whether the update authority is acquired. The processor 120 may reflect a frame stored in the WAL file 770 to the database file 710. For example, the processor 120 may reflect the first frame 752 stored in the WAL file 770 to the third page 713 of the database file 710, and may reflect the second frame 755 stored in the WAL file 770 to the fifth page 715 of the database file 710.

In operation 819, the processor 120 may invalidate the WAL file corresponding to the security data. The operation of invalidating the WAL file may correspond to delete the WAL file corresponding to the security data after the checkpoint operation is successfully performed. The operation of invalidating the WAL file may include an operation of truncating the size of the WAL file to 0 or an operation of overwriting the frame of the WAL file corresponding to the security data with 0. The processor 120 may perform one of the truncating operation and the overwriting operation based on a storage space of the memory (e.g., the memory 130 of FIG. 1) of the electronic device 101. The truncating operation may truncate the size of the WAL file to 0, and the overwriting operation may overwrite the file of the WAL file corresponding to the security data with 0 while maintaining the size of the WAL file. The storage space of the memory 130 may refer to available space that can be stored in the memory 130. The processor 120 may perform the overwriting operation when the storage space of the memory 130 is greater than or equal to a predetermined size, and may perform the truncating operation when the storage space of the memory 130 is less than the predetermined size.

Figure 9A:
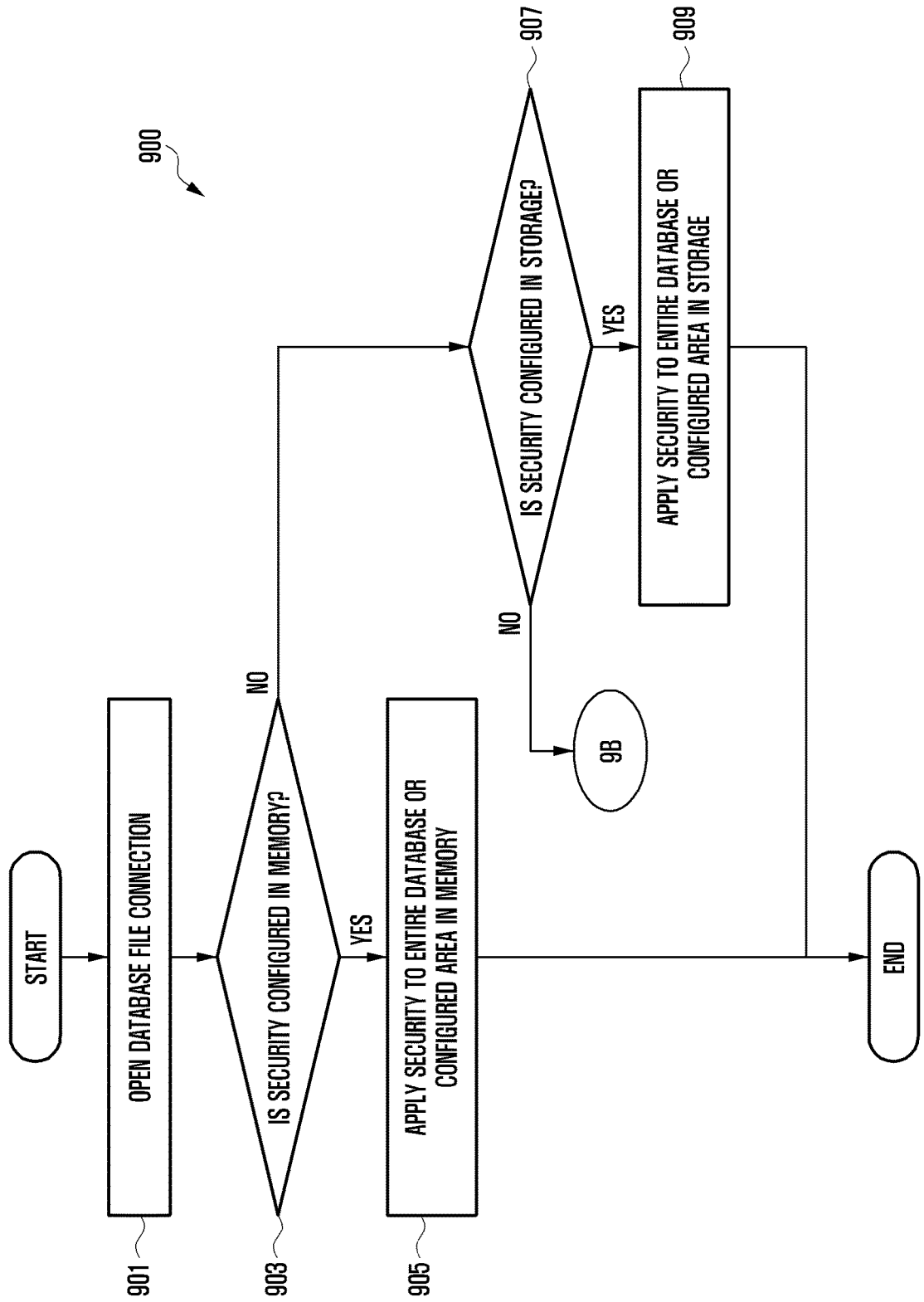
FIGS. 9A and 9B are flowcharts illustrating a method of configuring security data in an electronic device according to various embodiments of the disclosure.

FIG. 9A is a flowchart 900 illustrating a method of configuring security data in an electronic device according to an embodiment of the disclosure.

Referring to FIG. 9A, in operation 901, a processor (e.g., the processor 120 of FIG. 1) of an electronic device (e.g., the electronic device 101 of FIG. 1) according to various embodiments may open a connection of a database file (e.g., the database file 251 of FIG. 2). The database file 251 may need to be opened to execute an application or to update (e.g., read, add, modify, or delete) application data.

In operation 903, the processor 120 may determine whether security attributes are configured in a memory with respect to the opened database file 251. Security may be configured for the entire database file 251, a designated table of the database file 251, or a designated column of the database file 251. An application developer may assign security attributes to the entire database file 251, the designated table of the database file 251, or the designated column of the database file 251. The security attributes may be updated in a memory (e.g., the volatile memory 132 of FIG. 1) or may be stored in a storage (e.g., the nonvolatile memory 134 of FIG. 1) according to a value configured by the application developer.

The processor 120 may perform operation 905 when security is configured in the memory with respect to the opened database file 251, and may perform operation 907 when security is not configured in the memory with respect to the opened database file 251.

When security is configured in the memory with respect to the opened database file 251, in operation 905, the processor 120 may apply security attributes to the entire opened database file 251, a configured area (e.g., a designated table of the database file 251 or a designated column of the database file 251) in the memory. For example, the processor 120 may apply the security attributes to be configured in table 1 (e.g., SQLiteDatabase. openDatabase (secure_data: table1)) of the database file 251. The security attributes may be stored in a designated location in the memory. The location where the security attributes are stored may vary depending on the type (e.g., the entire database file 251, a designated table, or a designated column of the table) in which the security attributes are configured. The content stored in the memory may have the same life cycle as a database connection occurring when the database file 251 is opened. Once security data configuration is completed for the connection of the opened database file 251, secure deletion may be guaranteed in change and deletion operations using the corresponding connection.

When security is not configured in the memory with respect to the opened database file 251, in operation 907, the processor 120 may determine whether security is configured in the storage. The processor 120 may perform operation 909 when security is configured in the storage, and may perform operations of FIG. 9B when security is not configured in the storage.

When security is configured in the storage, in operation 909, the processor 120 may apply security attributes to the entire database file 251 opened in the storage or a configured area (e.g., a designated table of the database file 251 or a designated column of the database file 251) to the storage. When the security attributes are maintained only in the memory, the security attributes may be required to be configured again whenever the connection to the database file 251 newly occurs. In addition, the configuration of the security attributes may be different in different connections of the database file 251. When the security attributes are stored in the storage, in the configured security attributes, the corresponding configuration may be shared in all connections to the database file 251, and the configured security attributes may remain valid until a configured target (e.g., application) is deleted. A method of configuring the security attributes in the storage may include a method of writing corresponding information in a designated position of an existing database file (e.g., a database header) or a method of storing corresponding information in a new file.

Figure 9B:
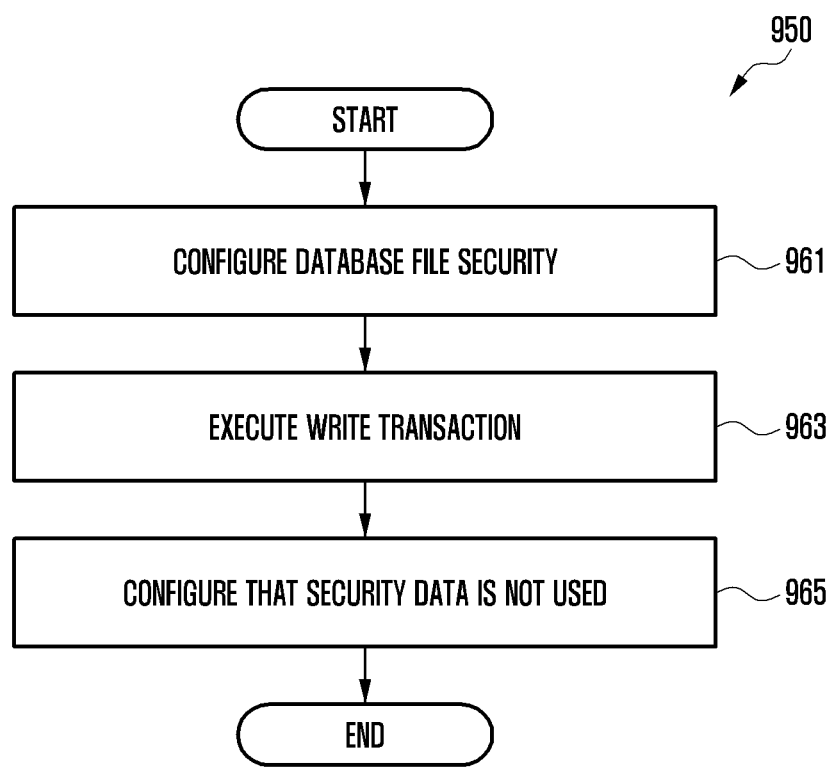

FIG. 9B is a flowchart 950 illustrating a method of configuring security data in an application layer of an electronic device according to an embodiment of the disclosure.

Referring to FIG. 9B, when the security attributes are not configured in the storage or the memory, the processor 120 may configure security data through a write transaction. When the security attributes are not configured in the storage or the memory, a write transaction to be currently performed may be configured to proceed as a secure write transaction. The write transaction may correspond to an update transaction or a deletion transaction. The secure write transaction may delete data whose security is configured. The application layer (or application) may be able to configure a configuration unit or a configuration timing (e.g., life cycle) of the security attributes. The configuration unit may include at least one of the entire database file 251, a designated table of the database file 251, or a designated column of the database file 251.

In operation 961, the processor 120 may configure the security attributes in the database file 251. The processor 120 may configure the security attributes for the connection to the database file 251 before starting the write transaction. In the case of a write transaction through an API or a write transaction through a security query, the processor 120 may configure the security attributes in the database file 251.

In operation 963, the processor 120 may execute the write transaction. The application layer (or application) may perform a secure deletion function when a user calls a corresponding API according to an API calling the secure write transaction. For example, the processor 120 may execute the secure write transaction using an API statement such as SQLiteDatabase.secure_delete( . . . ). In the security configuration, the security attributes may be applied to the entire database file 251 or a configured area (e.g., a designated table {e.g., SQLiteDatabase.setSecureData("table name")} of the database file 251 or a designated column of the database file 251).

In the case of the write transaction through the security query, the processor 120 may add a promised reserved word to a query. The reserved word may be, for example, update or delete. The secure deletion function may be configured by constructing structured query language (SQL) by inserting a configuration value (e.g., secure) related to the security attributes in a promised position (e.g., before or after the query) of the configured query (e.g., update or delete). Alternatively, the secure deletion function may be configured by configuring SQL by inserting a statement (e.g., by secure transaction) related to the security attributes at the last position related to the transaction. For example, the application layer (e.g., application) may configure the security attributes (e.g., add SECURE_DATA Constraint at CREATE TABLE) in a specific range using the SQL statement.

In the security configuration, the security attributes may be applied to the entire database file 251 or to the configured area (e.g., a designated table of the database file 251 or a designated column of the database file 251). For example, the application layer (e.g., application) may configure security for table 1 of the database file 251 with "CREATE SECURE_DATA TABLE table1". The application may configure security for the column of the database file 251 with "CREATE TABLE table1 (a SECURE_DATA TEXT . . . )". The application layer (e.g., application) may execute a secure write transaction using an SQL statement such as SECURE_DATA DELETE data from table1. The corresponding deletion operation may be performed as the secure write transaction.

In operation 965, the processor 120 may configure that the security data is not used. For example, the processor 120 may cancel the security attribute configuration when the write transaction is completed.

Figure 10:
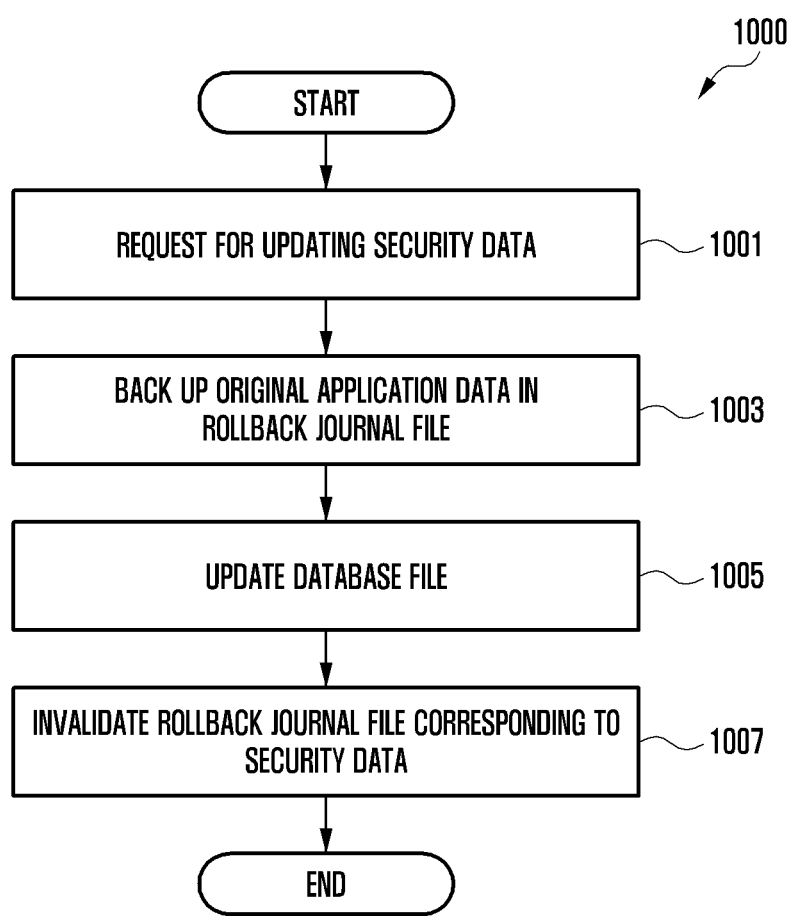
FIG. 10 is a flowchart illustrating another operating method of an electronic device according to an embodiment of the disclosure.

FIG. 10 is a flowchart 1000 illustrating another operating method of an electronic device according to an embodiment of the disclosure. FIG. 10 may include an operation when an additional file (e.g., the additional file 255 of FIG. 2) is a rollback journal file.

Referring to FIG. 10, in operation 1001, a processor (e.g., the processor 120 of FIG. 1) of an electronic device (e.g., the electronic device 101 of FIG. 1) according to various embodiments may receive a request for updating security data. The security data may refer to data for which security is configured among application data, and may be configured to perform a secure deletion function only for a designated transaction when the entire database file 251 or a desired area (e.g., a designated table or column of the database file 251 of FIG. 2) is configured by an application developer or when the security data is updated. The update refers to a transaction, and the transaction may include an operation of reading, adding, deleting, or modifying application data. The update request may include an operation of modifying or deleting the security data.

According to various embodiments, the processor 120 may determine whether a rollback journal mode is a persist mode. The persist mode may be a mode that invalidates only a header file among rollback journal files created for transactions. When only the header part is deleted, the security data may remain in the rollback journal file. When the rollback journal mode is the persist mode, the processor 120 may perform operations 1003 to 1007 below. The processor 120 may perform an operation (e.g., an operation of backing up application data stored in the database file 251 to the rollback journal file before updating and invalidating the rollback journal file after updating the database file 251) of an existing rollback journal mode when the rollback journal mode is not the persist mode or in response to the update request of the application data other than the security data.

In operation 1003, the processor 120 may back up original application data in the rollback journal file (or additional file) based on the update request. A journal technique may be a technique of producing and utilizing a rollback journal file (e.g., the additional file 255 of FIG. 2) in addition to a database file (e.g., the database file 251 of FIG. 2) storing application data. When the additional file is the rollback journal file, the processor 120 may back up application data stored in the database file 251 to the rollback journal file before updating the database file 251.

In operation 1005, the processor 120 may update the database file 251. Updating the database file 251 may be a checkpoint operation, and may refer to reflecting changes in the database file 251 in response to the update request. When the additional file is the rollback journal file, the processor 120 may update the database file 251 whenever an update is requested.

In operation 1007, the processor 120 may invalidate the rollback journal file corresponding to the security data. The operation of invalidating the rollback journal file may include deleting the rollback journal file corresponding to the security data after the checkpoint operation succeeds. The operation of invalidating the rollback journal file may include truncating the size of the rollback journal file to 0 or overwriting the rollback journal file corresponding to the security data with 0. The processor 120 may perform one of the truncating operation or the overwriting operation based on a storage space of a memory (e.g., the memory 130 of FIG. 1) of the electronic device 101. The truncating operation may truncate the size of the rollback journal file to 0, and the overwriting operation may overwrite the rollback journal file corresponding to the security data with 0 while maintaining the size of the rollback journal file. The storage space of the memory 130 may refer to available space that can be stored in the memory 130. The processor 120 may perform the overwriting operation when the storage space of the memory 130 is greater than or equal to a predetermined size, and may perform the truncating operation when the storage space of the memory 130 is less than the predetermined size.

Figure 11:
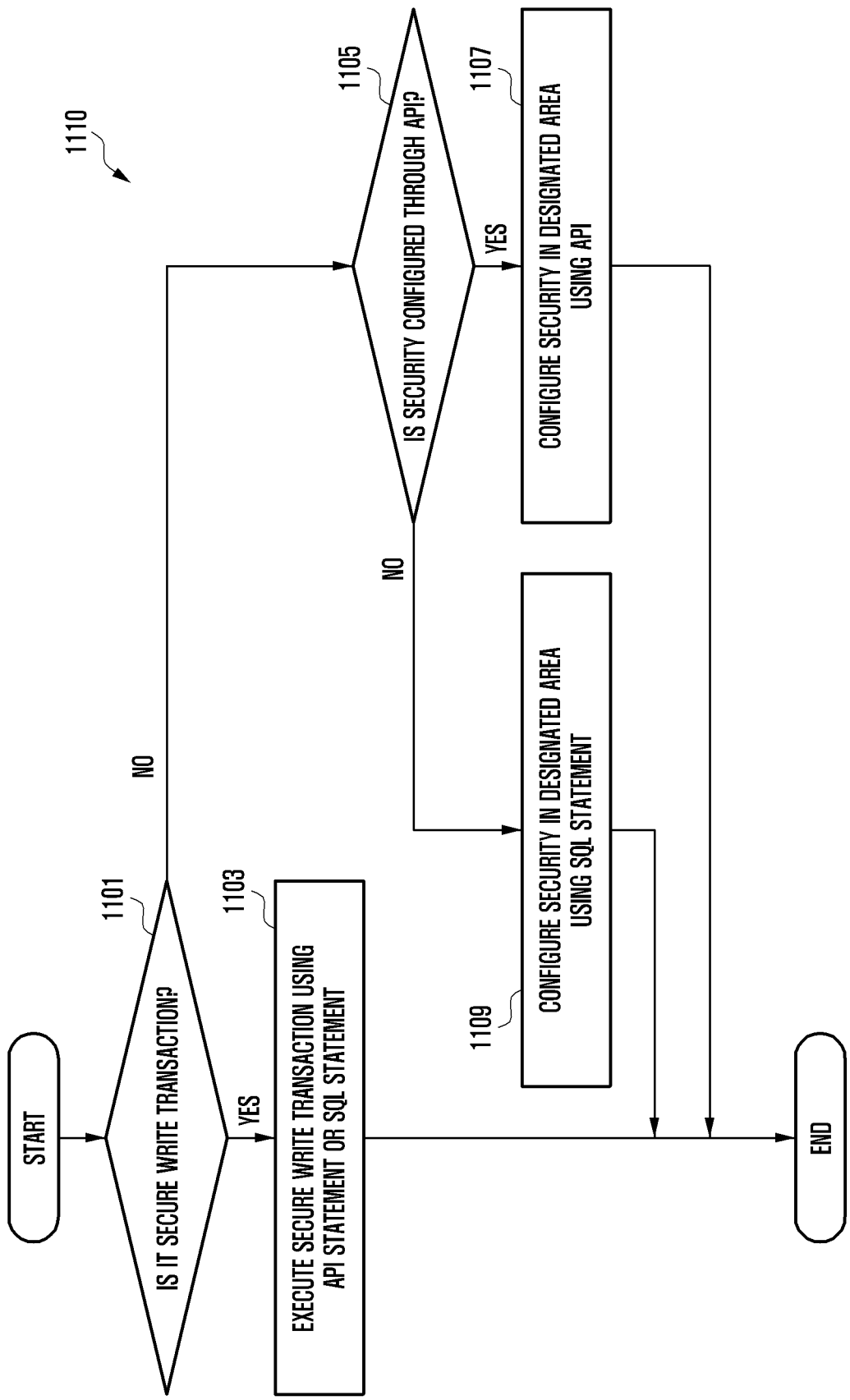
FIG. 11 is a flowchart illustrating a method of configuring security data in an application layer of an electronic device according to an embodiment of the disclosure.

FIG. 11 is a flowchart 1110 illustrating a method of configuring security data in an application layer of an electronic device according to an embodiment of the disclosure.

Referring to FIG. 11, in operation 1101, a processor (e.g., the processor 120 of FIG. 1) of an electronic device (e.g., the electronic device 101 of FIG. 1) according to various embodiments may determine whether a corresponding transaction is a secure write transaction. The secure write transaction may delete data for which security is configured. The processor 120 may perform operation 1103 when the corresponding transaction is the secure write transaction and may perform operation 1105 when the corresponding transaction is not the secure write transaction.

Although it is shown that operation 1101 is performed first and operation 1105 is performed later in the drawing, operation 1105 may be performed before operation 1101, or operation 1101 and operation 1105 may be performed simultaneously. This is only an example, and the disclosure is not limited by the description.

When the corresponding transaction is the secure write transaction, in operation 1103, the processor 120 may execute the secure write transaction using an API statement or an SQL statement. For example, an application layer (e.g., application) may execute the secure write transaction using an API statement such as SQLiteDatabase.secure_delete( . . . ). Alternatively, the application layer may execute the secure write transaction using an SQL statement such as SECURE_DATA DELETE data from table1.

When the corresponding transaction is not the secure write transaction, in operation 1105, the processor 120 may determine whether a corresponding security configuration is a security configuration through API. The processor 120 may perform operation 1107 when the corresponding security configuration is the security configuration through API, and may perform operation 1109 when the corresponding security configuration is not the security configuration through API.

When the corresponding security configuration is the security configuration through API, in operation 1107, the processor 120 may configure security in a designated area using the API. For example, the application layer (e.g., application) may use an API such as SQLiteDatabase.setSecureData("table name") to configure security attributes in a designated area (e.g., the entire database file 251 or a designated table or column of the database file 251).

When the corresponding security configuration is not the security configuration through API, in operation 1109, the processor 120 may configure security in the designated area using an SQL statement. The application layer (e.g., application) may use the SQL statement to configure the security attributes in the designated area (e.g., the entire database file 251 or a designated table or column of the database file 251). For example, the application layer (e.g. application) may add SECURE_DATA Constraint at CREATE TABLE time, may configure the security attributes in a designated table (e.g. table 1) of the database file 251, such as CREATE SECURE_DATA TABLE table1, or may configure the security attributes in a designated column of the database file 251, such as CREATE TABLE table1 (a SECURE_DATA TEXT . . . ).

According to various embodiments, the processor 120 may configure the life cycle in the same way as in FIG. 11. For example, the application layer (e.g., application) may configure the life cycle in various ways according to the provision of a framework. The life cycle may be configured in the database file 251, a designated table of the database 250, and a designated column of the database 250 using the API or SQL statement. The life cycle may be configured through secure write transaction execution using the API statement or secure write transaction execution using the SQL statement.

An operating method of an electronic device (e.g., the electronic device 101 of FIG. 1) according to various embodiments may include receiving a request for updating security data in which security attributes are configured in application data; identifying a state of an additional file corresponding to the security data; determining a first security data processing process when the identified state of the additional file is invalid and determining a second security data processing process when the identified state of the additional file is valid; and updating the security data according to the determined security data processing process.

The first security data processing process may include acquiring an update authority for a database file stored in the memory, updating the database file to correspond to the security data without the additional file, and returning the update authority when the update is completed.

The second security data processing process may include determining whether a page structure of the database file stored in the memory is changed, determining whether a page corresponding to the security data exists in the additional file when the page structure is not changed, acquiring the update authority of the database file when the page corresponding to the security data does not exist in the additional file, updating the database file to correspond to the security data without the additional file, and returning the update authority when the update is completed.

The updating of the security data may further include performing a third security data processing process when the first security data processing process or the second security data processing process fails.

The third security data processing process may include adding a frame corresponding to the security data to the additional file, producing a thread for processing the security data, waiting for the update by a life cycle when the life cycle is configured in the security data, determining whether an update condition of the additional file is satisfied after the life cycle has elapsed, acquiring an update authority for the database file to attempt to update the database file to correspond to the security data when the update condition is satisfied, determining whether the update condition of the additional file is satisfied when the life cycle is not configured in the security data, acquiring the update authority for the database file to attempt to update the database file to correspond to the security data when the updated condition is satisfied, and invalidating the additional file corresponding to the security data when the update is completed.

The invalidating may include performing one of truncating the size of the additional file corresponding to the security data based on a storage space of the memory and overwriting the frame of the additional file.

The method may further include determining whether security attributes are configured in a storage for the database file when the database file stored in the memory is opened; applying the security attributes to the entire opened database file when the security attributes are configured in the storage, determining whether the security attributes are configured in the memory when the security attributes are not configured in the storage; and reading a value configured in the memory to perform update corresponding to the security data when the security attributes are configured in the memory. The security attributes of the storage may have a characteristic of being maintained until an application corresponding to the database file is deleted, and the security attributes of the memory may have a characteristic of being maintained to correspond to a connection of the database file.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a memory; and
   a processor configured to be operatively connected to the display or the memory, wherein the processor is configured to:
      receive a request for updating security data in which security attributes are configured in application data,
      identify a state of an additional file corresponding to the security data,
      determine a first security data processing process when the identified state of the additional file is invalid or determine a second security data processing process when the identified state of the additional file is valid, and
      update the security data according to the determined security data processing process.

2. The electronic device of claim 1, wherein the processor is further configured to perform the first security data processing process to:
   acquire an update authority for a database file stored in the memory,
   update the database file corresponding to the security data without the additional file, and
   return the update authority when the update is completed.

3. The electronic device of claim 1, wherein the processor is further configured to perform the second security data processing process to:
   determine whether a page structure of a database file stored in the memory is changed,
   determine whether a page corresponding to the security data exists in the additional file when the page structure is not changed,
   acquire an update authority of the database file when the page corresponding to the security data does not exist in the additional file,
   update the database file to correspond to the security data without the additional file, and
   return the update authority when the update is completed.

4. The electronic device of claim 1, wherein the processor is further configured to perform a third security data processing process when the first security data processing process or the second security data processing process fails.

5. The electronic device of claim 4, wherein the processor is further configured to perform the third security data processing process to:
   add a frame corresponding to the security data to the additional file,
   produce a thread for processing the security data,
   update a database file to correspond to the security data based on a life cycle configured in the security data, and
   invalidate the additional file corresponding to the security data when the update is completed.

6. The electronic device of claim 5, wherein the processor is further configured to:
   when the life cycle is configured in the security data, wait for the update by the life cycle, determine whether an update condition of the additional file is satisfied after the life cycle has elapsed, acquire an update authority for the database file to attempt to update the database file to correspond to the security data when the update condition is satisfied, and
   when the life cycle is not configured in the security data, determine whether the update condition of the additional file is satisfied, and acquire the update authority for the database file to attempt to update the database file to correspond to the security data when the update condition is not satisfied.

7. The electronic device of claim 6, wherein the processor is further configured to:
   determine whether a configured condition is satisfied when the attempted update fails,
   wait for the update until acquiring the update authority when the configured condition is satisfied, and
   acquire the update authority to update the database file to correspond to the security data.

8. The electronic device of claim 5, wherein the processor is further configured to invalidate the additional file by truncating a size of the additional file corresponding to the security data or by overwriting a frame of the additional file.

9. The electronic device of claim 8, wherein the processor is further configured to perform one of an operation of truncating the size of the additional file based on a storage space of the memory or an operation of overwriting the frame of the additional file.

10. The electronic device of claim 9, wherein the processor is further configured to:
   perform the overwriting operation when the storage space of the memory is equal to or greater than a predetermined size, and
   perform the truncating operation when the storage space is less than the predetermined size.

11. The electronic device of claim 1, wherein the processor is further configured to:
- determine whether security attributes are configured in a storage for a database file when the database file stored in the memory is opened, and
- apply the security attributes to the entire opened database file when the security attributes are configured in the storage.

12. The electronic device of claim 11, wherein the processor is further configured to:
- determine whether the security attributes are configured in the memory when the security attributes are not configured in the storage; and
- read a value configured in the memory to perform update corresponding to the security data when the security attributes are configured in the memory,
- wherein the security attributes of the storage have a characteristic of being maintained until an application corresponding to the database file is deleted, and
- wherein the security attributes of the memory have a characteristic of being maintained to correspond to a connection of the database file.

13. The electronic device of claim 12, wherein the security attributes are configured in at least one of the entire database file and a table or column of the database file.

14. An operation method of an electronic device, the operation method comprising:
- receiving a request for updating security data in which security attributes are configured in application data;
- identifying a state of an additional file corresponding to the security data;
- determining a first security data processing process when the identified state of the additional file is invalid, and determining a second security data processing process when the identified state of the additional file is valid; and
- updating the security data according to the determined security data processing process.

15. The method of claim 14, wherein the first security data processing process comprises:
- acquiring an update authority for a database file stored in a memory;
- updating the database file to correspond to the security data without the additional file; and
- returning the update authority when the update is completed.

16. The method of claim 14, wherein the second security data processing process comprises:
- determining whether a page structure of a database file stored in a memory is changed;
- determining whether a page corresponding to the security data exists in the additional file when the page structure is not changed;
- acquiring an update authority of the database file when the page corresponding to the security data does not exist in the additional file;
- updating the database file to correspond to the security data without the additional file; and
- returning the update authority when the update is completed.

17. The method of claim 14, further comprising:
performing a third security data processing process when the first security data processing process or the second security data processing process fails.

18. The method of claim 17, wherein the third security data processing process comprises:
- adding a frame corresponding to the security data to the additional file;
- producing a thread for processing the security data;
- updating a database file to correspond to the security data based on a life cycle configured in the security data; and
- invalidating the additional file corresponding to the security data when the update is completed.

19. The method of claim 18, further comprising:
when the life cycle is configured in the security data,
- waiting for an update by the life cycle,
- determining whether an update condition of the additional file is satisfied after the life cycle has elapsed, and
- acquiring an update authority for the database file to attempt to update the database file to correspond to the security data when the update condition is satisfied; and when the life cycle is not configured in the security data,
- determining whether the update condition of the additional file is satisfied, and
- acquiring the update authority for the database file to attempt to update the database file to correspond to the security data when the update condition is not satisfied.

20. The method of claim 19, further comprising:
- determining whether a configured condition is satisfied when the attempted update fails;
- waiting for the update until acquiring the update authority when the configured condition is satisfied; and
- acquiring the update authority to update the database file to correspond to the security data.

* * * * *